United States Patent
Son et al.

(10) Patent No.: US 10,622,623 B2
(45) Date of Patent: Apr. 14, 2020

(54) COMPOSITE CATHODE ACTIVE MATERIAL, CATHODE AND LITHIUM BATTERY INCLUDING THE COMPOSITE CATHODE ACTIVE MATERIAL AND METHOD OF PREPARING THE COMPOSITE CATHODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Youhwan Son, Seongnam-si (KR); Seongyong Park, Hanam-si (KR); Jinsu Ha, Yongin-si (KR); Sukgi Hong, Seongnam-si (KR); Kwangjin Park, Seongnam-si (KR); Junho Park, Seoul (KR); Byungjin Choi, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 166 days.

(21) Appl. No.: 15/622,133

(22) Filed: Jun. 14, 2017

(65) Prior Publication Data
US 2017/0358797 A1 Dec. 14, 2017

(30) Foreign Application Priority Data

Jun. 14, 2016 (KR) .................. 10-2016-0073828
May 30, 2017 (KR) .................. 10-2017-0066978
Jun. 13, 2017 (KR) .................. 10-2017-0073696

(51) Int. Cl.
| | | |
|---|---|---|
| H01M 4/36 | (2006.01) | |
| H01M 4/525 | (2010.01) | |
| H01M 4/505 | (2010.01) | |
| H01M 4/04 | (2006.01) | |
| H01M 4/62 | (2006.01) | |
| C01G 53/00 | (2006.01) | |
| H01M 4/02 | (2006.01) | |
| H01M 10/0525 | (2010.01) | |

(52) U.S. Cl.
CPC ............ H01M 4/366 (2013.01); C01G 53/42 (2013.01); H01M 4/0471 (2013.01); H01M 4/505 (2013.01); H01M 4/525 (2013.01); H01M 4/628 (2013.01); C01P 2002/00 (2013.01); H01M 10/0525 (2013.01); H01M 2004/028 (2013.01)

(58) Field of Classification Search
CPC ............... C01G 53/42; C01P 2002/00; H01M 10/0525; H01M 2004/028; H01M 4/0471; H01M 4/366; H01M 4/505; H01M 4/525; H01M 4/628
See application file for complete search history.

(56) References Cited

U.S. PATENT DOCUMENTS

| | | | |
|---|---|---|---|
| 8,107,223 B2 | 1/2012 | Lipka et al. | |
| 2009/0142666 A1* | 6/2009 | Kim ....................... | B82Y 30/00 429/224 |
| 2015/0364789 A1 | 12/2015 | Ogawa et al. | |
| 2015/0364790 A1 | 12/2015 | Yonehara et al. | |

FOREIGN PATENT DOCUMENTS

JP  2013149586 A  8/2013

OTHER PUBLICATIONS

Yang et al. (Journal of Power Sources 189 (2009) 1147-1153) (Year: 2009).*
Scientific & Technical Information Center (STIC) Search results by Sam Darwish (Year: 2018).*
Scientific & Technical Information Cetnter (STIC) search results by Mei Huang (Year: 2019).*
Maki et al., "Nickel-Aluminum Layered Double Hydroxide Coating on the Surface of Conductive Substrates by Liquis Phase Deposition", Applied Materials & Interfaces, 7,2015, 17188-17198.
Quan et al., "Structure and electrochemical properties of multiple metal oxide nanoparticles as cathodes of lithium potteries", Journal of Materials Chemistry A, 1, 2013, 8848-8856.
Wang et al., "Chemical power source based on layered double hydroxides", J. Solid State Electrochem, 19, 2015, v. 1933-1948.
Wu et al., "Nitrogen-doped carbon and high-content alumina containing bi-active cobalt oxides for efficient storage of lithium", Journal of Colloid and Interface Science, 462, 2016, pp. 183-190.
Fernanda F. C. Bazito et al., "Cathodes for Lithium Ion Batteries: the Benefits of Using Nanostructured Materials," Journal of the Brazilian Chemical Society, May 16, 2006, pp. 627-642, vol. 17, Issue 4.

* cited by examiner

*Primary Examiner* — Robert S Jones
*Assistant Examiner* — Victoria H Lynch
(74) *Attorney, Agent, or Firm* — Cantor Colburn LLP

(57) ABSTRACT

A composite cathode active material, includes a first metal oxide having a first layered crystal structure; and a second metal oxide having a second layered crystal structure, wherein the second metal oxide includes a layered double oxide (LDO). Also a cathode and a lithium battery including the composite cathode active material.

30 Claims, 10 Drawing Sheets

COMPOSITE CATHODE ACTIVE MATERIAL, CATHODE AND LITHIUM BATTERY INCLUDING THE COMPOSITE CATHODE ACTIVE MATERIAL AND METHOD OF PREPARING THE COMPOSITE CATHODE ACTIVE MATERIAL

CROSS-REFERENCE TO RELATED APPLICATION

This application claims priority to and the benefit of Korean Patent Application No. 10-2016-0073828, filed on Jun. 14, 2016, in the Korean Intellectual Property Office, Korean Patent Application No. 10-2017-0066978, filed on May 30, 2017, in the Korean Intellectual Property Office, and Korean Patent Application No. 10-2017-0073696, filed on Jun. 13, 2017, in the Korean Intellectual Property Office, and all the benefits accruing therefrom under 35 U.S.C. § 119, the contents of which are incorporated herein in their entirety by reference.

BACKGROUND

1. Field

The present disclosure relates to a composite cathode active material, a cathode and a lithium battery including the composite cathode active material, and a method of preparing the composite cathode active material.

2. Description of the Related Art

In order to manufacture various devices in a small size and to provide improved performance, a battery having improved energy density, improved specific energy, and improved charge/discharge performance is desired. In this regard there remains a need for an improved cathode active material.

SUMMARY

Provided is a composite cathode active material having improved capacity and which is capable of preventing performance deterioration of a battery.

Provided is a cathode including the composite cathode active material.

Provided is a lithium battery including the cathode.

Provided is a method of preparing the composite cathode active material.

Additional aspects will be set forth in part in the description which follows and, in part, will be apparent from the description, or may be learned by practice of the presented embodiments.

According to an aspect, a composite cathode active material includes: a first metal oxide having a first layered crystal structure; and a second metal oxide having a second layered crystal structure, wherein the second metal oxide comprises a layered double oxide (LDO).

According to an aspect of another embodiment, a cathode includes the composite cathode active material.

According to an aspect of another embodiment, a lithium battery includes the cathode.

According to an aspect of another embodiment, a method of preparing a composite cathode active material includes: contacting a layered double hydroxide (LDH) and a first metal oxide having a first layered crystal structure to prepare a mixture; and calcining the mixture to prepare the composite cathode active material, wherein the composite cathode active material includes a core, which includes the first metal oxide; and a coating layer on a core, wherein the coating layer includes the layered double oxide (LDO).

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
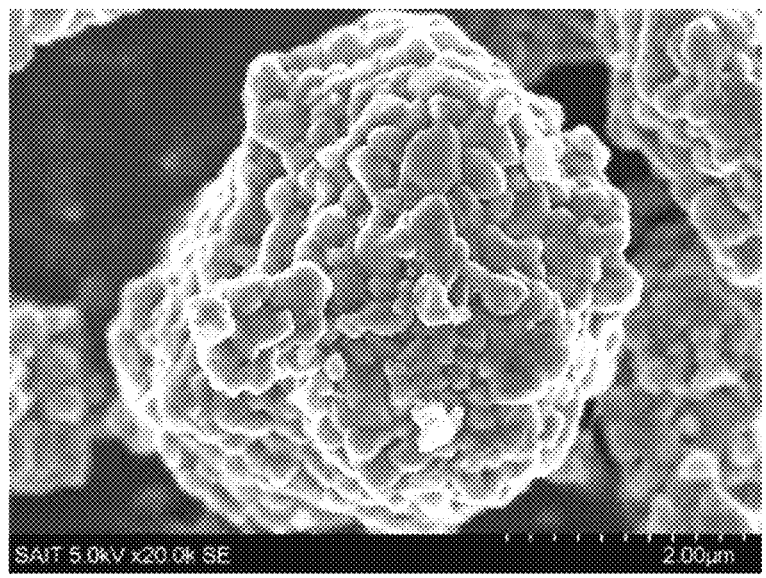
FIG. 1A is a scanning electron microscope (SEM) image of a surface of a composite cathode active material prepared in Example 8.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to exemplary embodiments, a composite cathode active material, a method of preparing the same, and a cathode and a lithium battery including the composite cathode active material will be described in further detail.

"Group" means a group of the Periodic Table of the Elements according to the International Union of Pure and Applied Chemistry ("IUPAC") Group 1-18 group classification system.

A C rate is a measure of the rate a battery is charged or discharged relative to its maximum capacity. A 1C rate means a current which will discharge the entire capacity in one hour. Thus, for example, for a battery with a capacity of 100 ampere-hrs, a C rate discharge would be a discharge current of 100 amperes, a 5C rate for this battery would be 500 amperes, and a C/2 rate would be 50 amperes.

While not wanting to be bound by theory, it is understood that current nickel-based cathode active materials fracture during charge and discharge, and that the fracture surfaces react with the electrolyte. By-products of the reaction, such as a transition metal that elutes from the cathode active material, and a gas, are produced, resulting in reduced battery performance, such as high rate characteristics and lifespan characteristics. Therefore, a method of preventing the performance deterioration is desired.

According to an embodiment, a composite cathode active material includes a composite of a first metal oxide having a first layered crystal structure; and a second metal oxide having a second layered crystal structure, wherein the second metal oxide includes a layered double oxide (LDO). Layered double oxide (LDO) is a mixed oxide with a 3D (three dimensional) network including a plurality of metal oxide layers. Layered double oxide (LDO) is calcination or thermal treatment product of Layered double hydroxide (LDH). Upon calcinations or thermal treatment, LDHs gradually lose interlayer water, and then dehydroxylate and decarbonate to a large extent, leading to the formation of a mixed oxide with a 3D (three dimensional) network. Layered double hydroxide (LDH) is a class of ionic solids characterized by a layered structure. For example, Layered double hydroxides (LDH) has the generic layer sequence $[AcBZAcB]_n$, where c represents layers of metal cations, A and B are layers of hydroxide $(HO^-)$ anions, and Z are layers of other anions and neutral molecules.

When the composite cathode active material includes a composite of the first metal oxide having the first layered crystal structure and the second metal oxide having the LDO, structural stability of the composite cathode active material is unexpectedly improved, and lifespan characteristics and thermal stability of a lithium battery may be improved. For example, when the composite cathode active material includes a composite of the first metal oxide and the LDO, a change of the oxidation number of a metal included in the first metal oxide and surface deterioration of the first metal oxide due to a transition of a crystal structure of the first metal oxide during charging/discharging are suppressed, and a side reaction with the electrolyte solution may be prevented. That is, structural stability of the composite cathode active material may be improved. Therefore, a lithium battery including the composite cathode active material may provide improved energy density, improved specific energy, and improved lifespan characteristics.

For example, the composite cathode active material may comprise a core and a coating layer disposed on at least a part of the core, wherein the core may comprise the first metal oxide, and the coating layer may comprise the second metal oxide including the LDO. The second metal oxide including the LDO may be disposed on at least a part of a surface of the core, e.g., on an outer surface of the core. For example, the LDO may be disposed on, e.g., attached to or coated on, at least a part of the surface of the core, which comprises the first metal oxide to form the coating layer. When the core including the first metal oxide is coated with the LDO, structural stability of the composite cathode active material is unexpectedly improved. For example, and while not wanting to be bound by theory, it is understood that when the composite cathode active material has a structure comprising the core and the coating layer, a side reaction with an electrolyte solution is suppressed because direct contact between the core and the electrolyte is blocked, decomposition of the electrolyte solution on a surface of the core is prevented, and elution and re-electrodeposition of lithium ions included in the core may be prevented. In this regard, lifespan characteristics of a lithium battery including the composite cathode active material may improve. For example, the coating layer may completely cover the core and thus may completely block direct contact between the core and the electrolyte solution. In an embodiment, although the coating layer covers and surrounds the core, some pores are present in the coating layer, and thus the core may contact the electrolyte solution through the pores. In an embodiment, the coating layer may partially cover the core. In an embodiment, the coating layer may be partially formed in the form of islands on the core.

When the core has a spinel crystal structure, and the coating layer has a layered crystal structure, structural mismatch may occur on an interface between the core and the coating layer. While not wanting to be bound by theory, it is understood that the structural mismatch may cause a crystal phase at the interface of the core and the coating layer to be unstable, which may result in performance deterioration of a lithium battery including the composite cathode active material.

In a composite of the composite cathode active material, at least a part of the second metal oxide may be bonded to the first metal oxide via a chemical bond. The composite of the composite cathode active material is different from a simple physical mixture of the first metal oxide and the second metal oxide. A simple physical mixture does not have a chemical bond between the first metal oxide and the second metal oxide but only a physical attraction such as Van der Waals' forces therebetween. On the contrary, since the composite of the composite cathode active material is prepared by, for example, calcining or mechanical milling, a chemical bond and/or a mechanochemical bond is formed between the first metal oxide and the second metal oxide. For example, a chemical bond, such as a covalent bond or an ionic bond, may be formed between the first metal oxide and the second metal oxide. In the composite of the composite cathode active material, the second metal oxide may form a dense coating layer. Thus, the composite of the composite cathode active material may have a significantly decreased BET specific surface area compared to that of the simple mixture of the first metal oxide and the second metal oxide, and a reaction with an electrolyte may be suppressed.

In the composite cathode active material, the second metal oxide having the second layered crystal structure and the first metal oxide having the first layered crystal structure may have different crystal structures. For example, in an embodiment, the second metal oxide may have a rhombohedral crystal structure, and the first metal oxide may have a monoclinic crystal structure.

In the composite cathode active material, the second metal oxide having the second layered crystal structure and the first metal oxide having the first layered crystal structure may belong to different space groups than each other. For example, the second metal oxide may have a rhombohedral crystal structure that belongs to an R3m space group, and the first metal oxide may have a monoclinic crystal structure that belongs to a C2/m space group.

In the composite cathode active material, the second metal oxide having the second layered crystal structure and the first metal oxide having the first layered crystal structure may have different composition than each other. For example, the second metal oxide and the first metal oxide may different compositional formulas than each other. For example, at least one of the metals included in the second metal oxide may be different from those included in the first metal oxide. For example, in the composite cathode active material, Al, Fe, V, Ti, or Ga may be included in only one of the first metal oxide and the second metal oxide. For example, in the composite cathode active material, Al, Fe, V, Ti, or Ga may be included only in the second metal oxide and may not be included in the first metal oxide.

In the composite cathode active material, the second metal oxide may include a metal that is positioned at, e.g., occupies, a crystallographic site in the crystal structure having octahedral coordination. A metal included in the LDO, e.g., a single metal, or a plurality of metals of the second metal oxide, e.g., Al and Fe, may occupy the octahedral site. For example, a metal included in the LDO may be positioned at the site having octahedral coordination. For example, two metals, e.g., Al and Fe, may be positioned at octahedral sites of the LDO.

In the composite cathode active material, the second metal oxide may include an LDO that is represented by Formula 1:

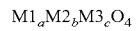

$$M1_aM2_bM3_cO_4 \quad \text{Formula 1}$$

In Formula 1, 0≤a≤2, 0<c≤2, and b+c=3; and M is an alkali metal, M2 is a metal and comprises an element of Groups 2, 9, 10, 11, or 12 of the periodic table, and M3 is a metal and comprises an element of Groups 3, 4, 5, 8, or 13 of the periodic table. The alkali metal may comprise Li, Na, K, or Rb. Li is specifically mentioned.

For example, in the composite cathode active material, the second metal oxide may include an LDO that is represented by Formula 2:

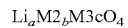

$$Li_aM2_bM3cO_4 \quad \text{Formula 2}$$

In Formula 2, 0≤a≤2, 0<c≤2, b>c, and b+c=3; and M2 is a metal and comprises Co, Mg, Ni, Cu, or Zn, and M3 is a metal and comprises Ce, Al, Fe, V, Ti, or Ga.

For example, Li in the LDO may be formed by reaction of a residual lithium compound on the surface of the first metal oxide, such as $Li_2CO_3$ and LiOH, with a layered double hydroxide (LDH). The residual lithium compound on the surface of the first metal oxide, such as $Li_2CO_3$ and LiOH, may serve as a lithium source of the LDO.

For example, in the composite cathode active material, the second metal oxide may include an LDO that is represented by Formula 2-1:

$$Li_aM2_2M3O_4 \quad \text{Formula 2-1}$$

In Formula 2-1, $0 \leq a \leq 2$; and M2 is a metal and comprises Co, Mg, Ni, Cu, or Zn, and M3 is a metal and comprises Ce, Al, Fe, V, Ti, or Ga. For example, $0<a \leq 2$. For example, $0.5 \leq a \leq 1.5$. For example, $0.8 \leq a \leq 1.2$. For example, $0.9 \leq a \leq 1.1$.

For example, in the composite cathode active material, the second metal oxide may comprise a LDO and may comprise $LiCo_2CeO_4$, $LiMg_2CeO_4$, $LiNi_2CeO_4$, $LiCu_2CeO_4$, $LiZn_2CeO_4$, $LiCo_2AlO_4$, $LiMg_2AlO_4$, $LiNi_2AlO_4$, $LiCu_2AlO_4$, $LiZn_2AlO_4$, $LiCo_2FeO_4$, $LiMg_2FeO_4$, $LiNi_2FeO_4$, $LiCu_2FeO_4$, $LiZn_2FeO_4$, $LiCo_2VO_4$, $LiMg_2VO_4$, $LiNi_2VO_4$, $LiCu_2VO_4$, $LiZn_2VO_4$, $LiCo_2TiO_4$, $LiMg_2TiO_4$, $LiNi_2TiO_4$, $LiCu_2TiO_4$, $LiZn_2TiO_4$, $LiCo_2GaO_4$, $LiMg_2GaO_4$, $LiNi_2GaO_4$, $LiCu_2GaO_4$, or $LiZn_2GaO_4$. A combination comprising at least one of the foregoing may be used.

In the composite cathode active material, an interval between a plurality of metal oxide layers included in the LDO may be in a range of about 1 angstrom (□) to about 10 □. For example, in the composite cathode active material, an interval between a plurality of metal oxide layers included in the LDO may be in a range of about 2 □ to about 10 □. For example, in the composite cathode active material, an interval between a plurality of metal oxide layers included in the LDO may be in a range of about 2.5 □ to about 10 □. For example, in the composite cathode active material, an interval between a plurality of metal oxide layers included in the LDO may be in a range of about 3 □ to about 10 □. When the interval between the metal oxide layers is within these ranges, battery characteristics may improve.

In the composite cathode active material, an amount of the second metal oxide may be about 20 parts by weight or less, based on 100 parts by weight of the first metal oxide. For example, in the composite cathode active material, an amount of the second metal oxide may be about 15 parts by weight or less, based on 100 parts by weight of the first metal oxide. For example, in the composite cathode active material, an amount of the second metal oxide may be about 10 parts by weight or less, based on 100 parts by weight of the first metal oxide. For example, in the composite cathode active material, an amount of the second metal oxide may be about 5 parts by weight or less, based on 100 parts by weight of the first metal oxide. For example, in the composite cathode active material, an amount of the second metal oxide may be about 3 parts by weight or less, based on 100 parts by weight of the first metal oxide. For example, in the composite cathode active material, an amount of the second metal oxide may be in a range of about 0.05 parts to about 2 parts by weight, based on 100 parts by weight of the first metal oxide. For example, in the composite cathode active material, an amount of the second metal oxide may be in a range of about 0.1 parts to about 2 parts by weight, based on 100 parts by weight of the first metal oxide. For example, in the composite cathode active material, an amount of the second metal oxide may be in a range of about 0.3 parts to about 2 parts by weight, based on 100 parts by weight of the first metal oxide. When the amount of the second metal oxide is within these ranges, battery characteristics may improve.

In the composite cathode active material, a thickness of the coating layer including the second metal oxide may be about 200 nanometers (nm) or less. For example, in the composite cathode active material, a thickness of the coating layer including the second metal oxide may be about 150 nm or less. For example, in the composite cathode active material, a thickness of the coating layer including the second metal oxide may be about 100 nm or less. For example, in the composite cathode active material, a thickness of the coating layer including the second metal oxide may be about 50 nm or less. For example, in the composite cathode active material, a thickness of the coating layer including the second metal oxide may be about 30 nm or less. For example, in the composite cathode active material, a thickness of the coating layer including the second metal oxide may be about 20 nm or less. For example, in the composite cathode active material, a thickness of the coating layer including the second metal oxide may be about 10 nm or less. In an embodiment, the thickness of the coating layer may be about 1 nm to about 200 nm, 2 nm to about 100 nm, or about 4 nm to about 50 nm. When the thickness of the coating layer is within these ranges, battery characteristics may improve.

In the composite cathode active material, a caloric value of the composite may be about 90% or less of a caloric value of the first metal oxide. For example, a caloric value of the composite having the second metal oxide coated on the first metal oxide core may be about 90% or less of a caloric value of the first metal oxide core. For example, a caloric value of the composite having the second metal oxide coated on the first metal oxide core may be about 87% or less of a caloric value of the first metal oxide core. For example, a caloric value of the composite having the second metal oxide coated on the first metal oxide core may be about 85% or less of a caloric value of the first metal oxide core. For example, a caloric value of the composite having the second metal oxide coated on the first metal oxide core may be about 83% or less of a caloric value of the first metal oxide core. For example, a caloric value of the composite having the second metal oxide coated on the first metal oxide core may be about 81% or less of a caloric value of the first metal oxide core. In an embodiment, a caloric value of the composite may be about 90% to about 50%, about 88% to about 60%, or about 86% to about 70% of a caloric value of the first metal oxide core. When the caloric value of the composite is within these ranges, battery characteristics may improve. The caloric value may be determined by using a differential scanning calorimeter (DSC) as disclosed in Evaluation Example 6.

In the composite cathode active material, an amount of lithium remaining on a surface (also, referred to as "a surface residual lithium amount") of the composite may be about 90% or less of a surface residual lithium amount of the first metal oxide. For example, a surface residual lithium amount of the composite having the second metal oxide coated on the first metal oxide core may be about 87% or less of a surface residual lithium amount of the first metal oxide. For example, a surface residual lithium amount of the composite having the second metal oxide coated on the first metal oxide core may be about 85% or less of a surface residual lithium amount of the first metal oxide. For example, a surface residual lithium amount of the composite having the second metal oxide coated on the first metal oxide core may be about 83% or less of a surface residual lithium amount of the first metal oxide. For example, a surface residual lithium amount of the composite having the second metal oxide coated on the first metal oxide core may be about 82% or less of a surface residual lithium amount of the first metal oxide. For example, a surface residual lithium amount of the composite having the second metal oxide coated on the first metal oxide core may be about 90% to about 50%, about 88% to about 60%, or about 86% to about 70% of a surface residual lithium amount of the first metal oxide. When the surface residual lithium amount is within these ranges, battery characteristics may improve. The surface residual lithium amount may be determined according to a wet method (or titration method) disclosed in paragraph [0054] of Japanese Patent Publication 2016-081903, the content of which is incorporated herein by reference in its entirety.

A surface residual lithium amount of the composite cathode active material may be 2700 ppm or less. The surface residual lithium amount is an amount of lithium calculated from amounts of $Li_2CO_3$ and LiOH remaining on the composite cathode active material. For example, a surface residual lithium amount of the composite cathode active material may be 2600 ppm or less. For example, a surface residual lithium amount of the composite cathode active material may be 2500 ppm or less. For example, a surface residual lithium amount of the composite cathode active material may be 2400 ppm or less. For example, a surface residual lithium amount of the composite cathode active material may be 2300 ppm or less. For example, a surface residual lithium amount of the composite cathode active material may be 2200 ppm or less. For example, a surface residual lithium amount of the composite cathode active material may be 2000 ppm or less. For example, a surface residual lithium amount of the composite cathode active material may be 1500 ppm or less. For example, a surface residual lithium amount of the composite cathode active material may be 1000 ppm or less. For example, a surface residual lithium amount of the composite cathode active material may be 500 ppm or less. For example, a surface residual lithium amount of the composite having the second metal oxide coated on the first metal oxide core may be about 2700 ppm to about 100 ppm, about 2000 ppm to about 200 ppm, or about 1000 ppm to about 400 ppm. When the surface residual lithium amount of the composite cathode active material is less than 2700 ppm, a side reaction between the composite cathode active material and an electrolyte solution may be suppressed.

In the composite cathode active material, a zeta potential of the composite may be in a range of about −20 millivolts (mV) to about +20 mV at a pH in a range of about 9 to about 11. For example, a zeta potential of the composite having the second metal oxide coated on the first metal oxide core may be in a range of about −20 mV to about +20 mV at a pH in a range of about 9 to about 11. For example, a zeta potential of the composite having the second metal oxide coated on the first metal oxide core may be in a range of about −15 mV to about +15 mV at a pH in a range of about 9 to about 11. For example, a zeta potential of the composite having the second metal oxide coated on the first metal oxide core may be in a range of about −10 mV to about +10 mV at a pH in a range of about 9 to about 11. For example, a zeta potential of the composite having the second metal oxide coated on the first metal oxide core may be in a range of about −5 mV to about +5 mV at a pH in a range of about 9 to about 11. That is, a surface of the composite may be substantially neutral or may be weakly charged. When the zeta potential is within these ranges, battery characteristics may improve.

In the composite cathode active material, the composite may have a vibration peak that corresponds to an oxygen-metal-oxygen (O-M-O) bond present at about 730 $cm^{-1}$ to about 770 $cm^{-1}$ in the IR-spectrum. When the composite having the second metal oxide coated on the first metal oxide core has a vibration peak that corresponds to an O-M-O bond present at about 730 $cm^{-1}$ to about 770 $cm^{-1}$ in the IR-spectrum, battery characteristics may improve.

In the composite cathode active material, an Eg band peak of the Raman spectrum of the composite may be downshifted compared to an Eg band peak of the first metal oxide. In an embodiment, an Eg band peak of the Raman spectrum of the composite may occur at a wavenumber about 50 $cm^{-1}$ to about 2 $cm^{-1}$, about 40 $cm^{-1}$ to about 4 $cm^{-1}$, or about 30 $cm^{-1}$ to about 6 $cm^{-1}$ greater than a wavenumber of an Eg band peak of the first metal oxide. When the Eg band peak of the Raman spectrum of the composite having the second metal oxide coated on the first metal oxide core is down-shifted compared to the Eg band peak of the first metal oxide, battery characteristics may improve.

In the composite cathode active material, the first metal oxide may include a compound represented by Formula 3:

$$Li_xM_yO_z \qquad \text{Formula 3}$$

In Formula 3, $0 \leq x \leq 3$, $1 \leq y \leq 3$, and $2 \leq z \leq 8$; and M comprises an element of Group 2 to Group 13, or a combination thereof.

For example, in the composite cathode active material, the first metal oxide may include a compound represented by one of Formulas 4 to 6:

$$Li_xCo_{1-y}M_yO_{2-\alpha}X_\alpha \qquad \text{Formula 4}$$

$$Li_xNi_{1-y}Me_yO_{2-\alpha}X_\alpha \qquad \text{Formula 5}$$

$$Li_xNi_{1-y-z}Mn_yMa_zO_{2-\alpha}X_\alpha \qquad \text{Formula 6}$$

In Formulas 4 to 6, $0.90 \leq x \leq 1.1$, $0 \leq y \leq 0.9$, $0 < z \leq 0.2$, and $0 \leq \alpha \leq 2$; M comprises a metal comprising Ni, Mn, Zr, Al, Mg, Ag, Mo, Ti, V, Cr, Fe, Cu, B, or a combination thereof; Me comprises a metal comprising Co, Zr, Al, Mg, Ag, Mo, Ti, V, Cr, Mn, Fe, Cu, B, or a combination thereof; Ma comprises a metal comprising Co, Zr, Al, Mg, Ag, Mo, Ti, V, Cr, Fe, Cu, B, or a combination thereof; and X comprises O, F, S, P, or a combination thereof.

For example, in the composite cathode active material, the first metal oxide may include a compound represented by Formula 7:

$$Li_xNi_{1-y-z}Mn_yCo_zO_2 \qquad \text{Formula 7}$$

In Formula 7, $0.90 \leq x \leq 1.1$, $0 \leq y \leq 0.2$, $0 < z \leq 0.2$, and $0.71 \leq 1-y-z \leq 0.99$.

For example, in the composite cathode active material, the first metal oxide may include a compound represented by Formula 8:

$$Li[Li_{1-a}Me_a]O_{2+d} \qquad \text{Formula 8}$$

In Formula 8, $0.8 \leq a < 1$ and $0 \leq d \leq 0.1$; and Me comprises a metal comprising Ni, Co, Mn, Al, V, Cr, Fe, Zr, Re, B, Ge, Ru, Sn, Ti, Nb, Mo, Pt, or a combination thereof.

For example, in the composite cathode active material, the first metal oxide may include a compound represented by Formula 9:

$$Li[Li_{1-x-y-z}Ma_xMb_yMc_z]O_{2+d} \qquad \text{Formula 9}$$

In Formula 9, $0.8 \leq x+y+z < 1$, $0 < x < 1$, $0 < y < 1$, $0 < z < 1$, and $0 \leq d \leq 0.1$; and Ma, Mb, and Mc each independently comprise a metal comprising Mn, Co, Ni, Al, or a combination thereof.

For example, in the composite cathode active material, the first metal oxide may include a compound represented by Formula 10:

$$Li[Li_{1-x-y-z}Ni_xCo_yMn_z]O_{2+d}$$  Formula 10

In Formula 10, $0.8 \leq x+y+z < 1$; $0 < x < 1$, $0 < y < 1$, $0 < z < 1$, and $0 \leq d \leq 0.1$.

According to another embodiment, a cathode may include the composite cathode active material.

First, a cathode is prepared. The composite cathode active material, a conducting agent, a binder, and a solvent are mixed together to prepare a cathode active material composition. The cathode active material composition may be directly coated on an aluminum current collector to prepare a cathode plate having a cathode active material layer. In an embodiment, the cathode active material composition may be cast on a separate support to form a cathode film, which may then be separated from the support and laminated on an aluminum current collector to prepare a cathode plate (or a cathode) having a cathode active material layer.

The conducting agent may comprise carbon black, graphite particulate, natural graphite, artificial graphite, acetylene black, or Ketjen black; carbon fiber; carbon nanotube; a metal powder or metal fiber or metal tubes of copper, nickel, aluminum, or silver; or a conducting polymer such as a polyphenylene derivative, but the embodiment is not limited thereto. A combination comprising at least one of the foregoing may be used. Any suitable material available as a conducting agent in the art may be used.

Examples of the binder are a vinylidene fluoride/hexafluoropropylene copolymer, polyvinylidene fluoride (PVDF), polyacrylonitrile, polymethyl methacrylate, polytetrafluoroethylene (PTFE), mixtures thereof, and a styrene butadiene rubber polymer, but embodiments are not limited thereto. Any suitable material available as a binding agent in the art may be used. Examples of the solvent are N-methyl-pyrrolidone (NMP), acetone, or water, but embodiments are not limited thereto. Any suitable material available as a solvent in the art may be used.

In an embodiment, pores may be formed in the cathode plate by further including a plasticizing agent in the cathode active material composition.

The amounts of the composite cathode active material, the conducting agent, the binder, and the solvent may be in ranges that are used in lithium secondary batteries. At least one of the conducting agent, the binder, and the solvent may be omitted if desired, e.g., according to the use and the structure of the lithium secondary battery.

The cathode may include another cathode active material in addition to the disclosed composite cathode active material.

The other cathode active material is a lithium-containing metal oxide, which may be any suitable material available as a cathode active material in the art. For example, in an embodiment, the cathode active material may comprise a composite oxide of lithium with a metal comprising Co, Mn, Ni, or a combination thereof. In an embodiment, the cathode active material may comprise a compound represented by: $Li_aA_{1-b}B'_bD_2$ (where $0.90 \leq a \leq 1$ and $0 \leq b \leq 0.5$); $Li_aE_{1-b}B'_bO_{2-c}D_c$ (where $0.90 \leq a \leq 1$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1$, $\leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $\leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $\leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $\leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (were $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may comprise nickel (Ni), cobalt (Co), manganese (Mn), or a combination thereof; B' may comprise aluminum (Al), nickel (Ni), cobalt (Co), manganese (Mn), chromium (Cr), iron (Fe), magnesium (Mg), strontium (Sr), vanadium (V), a rare earth element, or a combination thereof; D may comprise oxygen (O), fluorine (F), sulfur (S), phosphorus (P), or a combination thereof; E may comprise cobalt (Co), manganese (Mn), or a combinations thereof; F' may comprise fluorine (F), sulfur (S), phosphorus (P), for a combination thereof; G may comprise aluminum (Al), chromium (Cr), manganese (Mn), iron (Fe), magnesium (Mg), lanthanum (La), cerium (Ce), strontium (Sr), vanadium (V), or a combination thereof; Q comprises titanium (Ti), molybdenum (Mo), manganese (Mn), or a combination thereof; I' comprises chromium (Cr), vanadium (V), iron (Fe), scandium (Sc), yttrium (Y), or a combination thereof; and J may comprise vanadium (V), chromium (Cr), manganese (Mn), cobalt (Co), nickel (Ni), copper (Cu), or a combination thereof.

The compounds listed above as cathode active materials may have a surface coating layer (hereinafter, also referred to as "coating layer"). Alternatively, a mixture of a compound without a coating layer and a compound having a coating layer, the compounds comprising the compounds listed above, may be used. In an embodiment, the coating layer may comprise a compound of a coating element which comprises an oxide, hydroxide, oxyhydroxide, oxycarbonate, and hydroxycarbonate of the coating element. In an embodiment, the compound for the coating layer may be amorphous or crystalline. In an embodiment, the coating element for the coating layer may comprise magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In an embodiment, the coating layer may be formed using any suitable method that does not adversely affect the physical properties of the cathode active material when a compound of the coating element is used. For example, the coating layer may be formed using a spray coating method or a dipping method. Further details of the coating methods may be well understood by one of ordinary skill in the art, or can be determined without undue experimentation, and thus a detailed description thereof will be omitted.

According to another embodiment, a lithium battery may include a cathode including the composite cathode active material. The lithium battery may be prepared in the following manner.

First, a cathode is prepared by the cathode plate preparation method described above.

Next, an anode is prepared as follows. The anode may be prepared in the same manner as the cathode, except that an anode active material is used instead of a composite cathode active material. Also, the same conducting agent, binder, and solvent used in the preparation of the cathode may be used in the preparation of an anode active material composition.

For example, an anode active material, a conducting agent, a binder, and a solvent are mixed together to prepare an anode active material composition. The anode active material composition may be directly coated on a copper current collector to prepare an anode plate. In an embodiment, the anode active material composition may be cast on a separate support to form an anode active material film, which may then be separated from the support and laminated on a copper current collector to prepare an anode plate (or an anode).

The anode active material may comprise any suitable material that is used in the art. Examples of the anode active material may comprise lithium metal, a metal that is alloyable with lithium, a transition metal oxide, a non-transition metal oxide, a carbonaceous material, or a combination thereof.

For example, the metal alloyable with lithium may comprise Si, Sn, Al, Ge, Pb, Bi, Sb, an Si—Y' alloy (where Y' is an alkali metal, an alkaline earth metal, a Group 13 element, a Group 14 element, a transition metal, a rare earth element, or a combined element thereof, and is not Si), or an Sn—Y' alloy (where, Y' is an alkali metal, an alkaline earth metal, a Group 13 element, a Group 14 element, a transition metal, a rare earth element, or a combined element thereof, and is not Sn). Examples of the element Y' may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide may include a lithium titanium oxide, a vanadium oxide, and a lithium vanadium oxide.

Examples of the non-transition metal oxide may include $SnO_2$ and $SiO_x$ (where, $0<x<2$).

The carbon-based material may comprise crystalline carbon, amorphous carbon, or a combination thereof. Examples of the crystalline carbon may include natural graphite and artificial graphite, each of which has an amorphous shape, a plate shape, a flake shape, a spherical shape, or a fiber shape. Examples of the amorphous carbon may include soft carbon (carbon calcined at a low-temperature), hard carbon, mesophase pitch carbide, and calcined cokes.

Amounts of the anode active material, the conducting agent, the binder, and the solvent may be at the same as those used in a commercial lithium secondary battery.

Next, a separator to be disposed between the cathode and the anode is prepared. The separator for the lithium battery may be any suitable separator that is used in lithium batteries. In an embodiment, the separator may have low resistance to migration of ions in an electrolyte and have an excellent electrolyte-retaining ability. Examples of the separator are glass fiber, polyester, Teflon, polyethylene, polypropylene, PTFE, and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

In an embodiment, a polymer resin, a filler, and a solvent may be mixed together to prepare a separator composition. Then, the separator composition may be directly coated on an electrode, and then dried to form the separator. In an embodiment, the separator composition may be cast on a support and then dried to form a separator film, which may then be separated from the support and laminated on an electrode to form the separator.

The polymer resin used to manufacture the separator may be any suitable material that is used as a binder for electrode plates. Examples of the polymer resin are a vinylidenefluoride/hexafluoropropylene copolymer, polyvinylidene fluoride (PVDF), polyacrylonitrile, poly(methyl)methacrylate, or a combination thereof.

Then, an electrolyte is prepared.

In an embodiment, the electrolyte may be an organic electrolyte solution. In an embodiment, the electrolyte may be in a solid phase. Examples of the electrolyte are lithium oxide and lithium oxynitride. Any suitable material available as a solid electrolyte in the art may be used. In an embodiment, the solid electrolyte may be formed on the anode by, for example, sputtering.

In an embodiment, the organic electrolyte solution may be prepared by dissolving a lithium salt in an organic solvent.

The organic solvent may be any suitable solvent available as an organic solvent in the art. In an embodiment, the organic solvent may comprise propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, or a combination thereof.

In an embodiment, the lithium salt may comprise any suitable material available as a lithium salt in the art. In an embodiment, the lithium salt may comprise $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a combination thereof.

Figure 8:
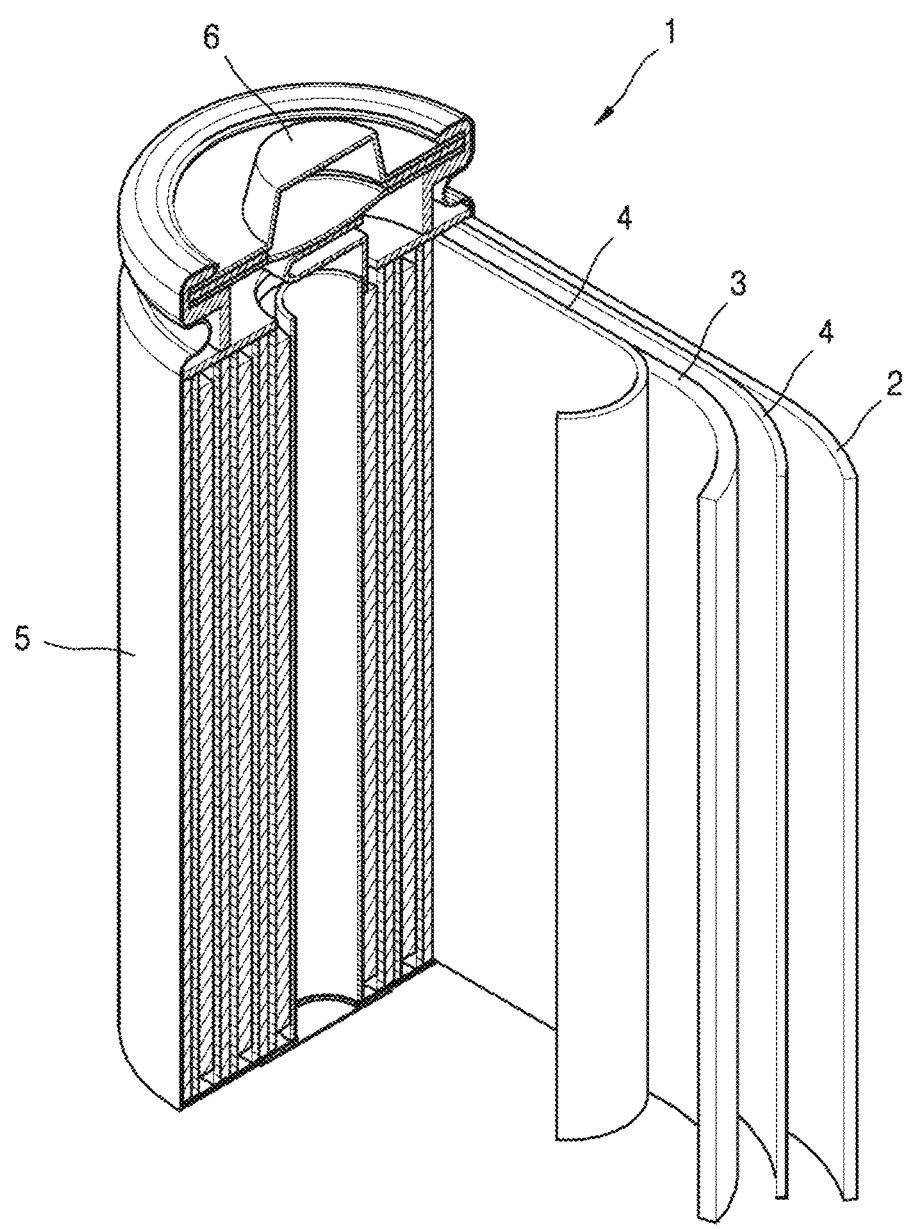
FIG. 8 is a schematic view of an embodiment of a lithium battery.

Referring to FIG. 8, a lithium battery 1 includes a cathode 3, an anode 2, and a separator 4. In an embodiment, the cathode 3, the anode 2, and the separator 4 may be wound or folded, and then sealed in a battery case 5. In an embodiment, the battery case 5 may be filled with an organic electrolytic solution and sealed with a cap assembly 6, thereby completing the manufacture of the lithium battery 1. In an embodiment, the battery case 5 may be a cylindrical type, a rectangular type, or a thin-film type. For example, the lithium battery 1 may be a large-sized thin-film type battery. In an embodiment, the lithium battery 1 may be a lithium ion battery.

In an embodiment, the separator 4 may be disposed between the cathode 3 and the anode 2 to form a battery assembly. In an embodiment, the battery assembly may be stacked in a bi-cell structure and impregnated with the electrolytic solution. In an embodiment, the resultant assembly may be put into a pouch and hermetically sealed, thereby completing the manufacture of a lithium ion polymer battery.

In an embodiment, a plurality of battery assemblies may be stacked to form a battery pack, which may be used in any suitable device that may benefit from high capacity and high output, for example, in a laptop computer, a smart phone, or an electric vehicle.

The lithium battery 1 may have improved lifetime characteristics and high-rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

According to another embodiment, a method of preparing a composite cathode active material may comprise contacting, e.g., mixing, a first metal oxide having a first layered crystal structure and a layered double hydroxide (LDH) to prepare a mixture; and calcining the mixture to prepare a coating layer including a double layered oxide (LDO) on a core including the first metal oxide to prepare the composite cathode active material. The composite cathode active material may comprise a core, which comprises the first metal oxide; and a coating layer on a core, wherein the coating layer comprises the layered double oxide.

In the method of preparing a composite cathode active material, the first metal oxide including the first layered crystal structure may be prepared by an available method. For example, a lithium precursor may be mixed with a first metal oxide precursor including a plurality of transition metals by a co-precipitation method and heat-treated to prepare the first metal oxide. In an embodiment, a lithium precursor may be mixed with a first metal oxide precursor including a plurality of transition metals by a co-precipitation method, the resulting mixture then heat-treated to prepare the first metal oxide, and then lithium remaining on a surface of the first metal oxide, which may be in a form of a lithium compound, such as lithium carbonate or lithium hydroxide, may be removed through a washing process. When the residual lithium is removed, a side reaction caused by the residual lithium may be suppressed, and thus lifespan characteristics of a lithium battery including the composite cathode active material may improve. The first metal oxide may substantially include a Ni-rich phase. For example, the first metal oxide may be a lithium transition metal oxide that includes a large amount of lithium. For example, some transition metal sites in the first metal oxide may be substituted with lithium.

In the method of preparing a composite cathode active material, the first metal oxide and the LDH may be mixed together by a wet method or a dry method. The wet method may be performed by mixing the first metal oxide and the LDH in a solvent such as alcohol to prepare an alcohol solution, and then drying the solvent to prepare a dry mixture. The dry method may be performed by mechanically mixing the first metal oxide and the LDH together in the form of powders to prepare a mixture.

In the method of preparing a composite cathode active material, the calcining may be performed at a temperature of about 500° C. or greater for about 5 hours to about 10 hours. For example, the calcining temperature may be in a range of about 500° C. to about 1000° C. For example, the calcining temperature may be in a range of about 600° C. to about 900° C. For example, the calcining temperature may be in a range of about 700° C. to about 800° C. For example, the calcining temperature may be in a range of about 700° C. to about 750° C.

When the calcining temperature is about 500° C. or lower, an electrochemical capacity of the first metal oxide having a layered crystal structure may not be manifested, and thus the calcining temperature needs to be at least 500° C.

In the method of preparing a composite cathode active material, the calcining may be performed in an oxygen atmosphere. For example, the calcining may be performed in an oxygen atmosphere, but the disclosed embodiment is not limited to this condition, and the condition may be appropriately selected within a range that may provide improved physical properties to the composite cathode active material in consideration of the type of metal.

In the method of preparing a composite cathode active material, and in the mixture of the first metal oxide and the LDH, the LDH may be attached on a surface of the first metal oxide by electrostatic force. For example, when a surface of the first metal oxide is charged with a negative charge and a surface of the LDH is charged with a positive charge, the LDH may be effectively attached to the surface of the first metal oxide due to the electrostatic force. In this regard, the coating layer may be evenly coated on a surface of the first metal oxide core.

In the method of preparing a composite cathode active material, the LDH may be represented by Formula 11:

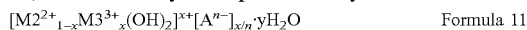

$$[M2^{2+}_{1-x}M3^{3+}_x(OH)_2]^{x+}[A^{n-}]_{x/n} \cdot yH_2O \quad \text{Formula 11}$$

In Formula 11, $0.1 \leq x \leq 0.4$ and $0 < y$; $M2^{2+}$ is a metal ion and may comprise $Co^{2+}$, $Mg^{2+}$, $Ni^{2+}$, $Cu^{2+}$, or $Zn^{2+}$, $M3^{3+}$ is a metal ion and may comprise $Ce^{3+}$, $Al^{3+}$, $Fe^{3+}$, $V^{3+}$, $Ti^{3+}$, or $Ga^{3+}$, $A^{n-}$ is an anion and may comprise $NO_3^-$, $SO_4^{2-}$, $CO_3^{2-}$, $PO_4^{2-}$, or $Cl^-$, and n is a charge number of an anion. For example, n is an integer of 1 to 6. For example, n is an integer of 2 to 6. For example, y is an integer of 1 to 6. For example, y is an integer of 4 to 6.

In an embodiment, the LDH may be represented by Formula 12:

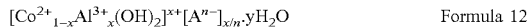

$$[Co^{2+}_{1-x}Al^{3+}_x(OH)_2]^{x+}[A^{n-}]_{x/n} \cdot yH_2O \quad \text{Formula 12}$$

In Formula 12, $0.1 \leq x \leq 0.4$, and $0 < y$; $A^{n-}$ is an anion comprising $NO_3^{2-}$, $SO_4^{2-}$, $CO_3^{2-}$, $PO_4^{2-}$, or $Cl^-$, and n is a charge number of the anion. For example, n is an integer of 1 to 6. For example, n is an integer of 2 to 6. For example, y is an integer of 1 to 6. For example, y is an integer of 4 to 6.

For example, the LDH may be $Co_2Ce(OH)_6(NO_3^{2-}) \cdot yH_2O$ (where y is 4 to 6), $Mg_2Ce(OH)_6(NO_3^{2-}) \cdot yH_2O$ (where y is 4 to 6), $Ni_2Ce(OH)_6(NO_3^{2-}) \cdot yH_2O$ (where y is 4 to 6), $Cu_2Ce(OH)_6(NO_3^{2-}) \cdot yH_2O$ (where y is 4 to 6), $Co_2Al(OH)_6(NO_3^{2-}) \cdot yH_2O$ (where y is 4 to 6), $Mg_2Al(OH)_6(NO_3^{2-}) \cdot yH_2O$ (where y is 4 to 6), $Ni_2Al(OH)_6(NO_3^{2-}) \cdot yH_2O$ (where y is 4 to 6), $Cu_2Al(OH)_6(NO_3^{2-}) \cdot yH_2O$ (where y is 4 to 6), $Co_2Fe(OH)_6(NO_3^{2-}) \cdot y_2O$ (where x is 4 to 6), $Mg_2Fe(OH)_6(NO_3^{2-}) \cdot y_2O$ (where y is 4 to 6), $Ni_2Fe(OH)_6(NO_3^{2-}) \cdot y_2O$ (where x is 4 to 6), $Cu_2Fe(OH)_6(NO_3^{2-}) \cdot y_2O$ (where y is 4 to 6), $Zn_2Fe(OH)_6(NO_3^{2-}) \cdot yH_2O$ (where y is 4 to 6), $Co_2V(OH)_6(NO_3^{2-}) \cdot y_2O$ (where y is 4 to 6), $Mg_2V(OH)_6(NO_3^{2-}) \cdot y_2O$ (where y is 4 to 6), $Ni_2V(OH)_6(NO_3^{2-}) \cdot y_2O$ (where y is 4 to 6), $Cu_2V(OH)_6(NO_3^{2-}) \cdot y_2O$ (where y is 4 to 6), $Zn_2V(OH)_6(NO_3^{2-}) \cdot yH_2O$ (where y is 4 to 6), $Co_2Ti(OH)_6(NO_3^{2-}) \cdot y_2O$ (where y is 4 to 6), $Mg_2Ti(OH)_6(NO_3^{2-}) \cdot y_2O$ (where y is 4 to 6), $Ni_2Ti(OH)_6(NO_3^{2-}) \cdot y_2O$ (where x is 4 to 6), $Cu_2Ti(OH)_6(NO_3^{2-}) \cdot y_2O$ (where y is 4 to 6), $Cu_2Ti(OH)_6(NO_3^{2-}) \cdot y_2O$ (where x is 4 to 6), $Zn_2Ti(OH)_6(NO_3^{2-}) \cdot y_2O$ (where y is 4 to 6), $Co_2Ga(OH)_6(NO_3^{2-}) \cdot yH_2O$ (where x is 4 to 6), $Mg_2Ga(OH)_6(NO_3^{2-}) \cdot yH_2O$ (where y is 4 to 6), $Ni_2Ga(OH)_6(NO_3^{2-}) \cdot yH_2O$ (where y is 4 to 6), $Cu_2Ga(OH)_6(NO_3^{2-}) \cdot yH_2O$ (where y is 4 to 6), or $Zn_2Ga(OH)_6(NO_3^{2-}) \cdot yH_2O$ (where y is 4 to 6).

Hereinafter, an embodiment will be described in more detail with reference to the following examples. However, these examples are provided herein for illustrative purpose only and not intended to limit the scope of the one or more embodiments.

EXAMPLES (Preparation of Composite Cathode Active Material (1))

Example 1 a) Preparation of Layered Double Hydroxide 10 milliliters (mL) of a solution mixture including 2 millimoles (mmol) of $Co(NO_3)_2 \cdot 6H_2O$ and 1 mmol of $Al(NO_3)_3 \cdot 9H_2O$ at a molar ratio of 2:1 was added to 0.15 M of NaOH solution being vigorously stirred within 5 seconds and stirred in a nitrogen atmosphere for 25 minutes.

A slurry thus obtained was centrifuged, washed with deionized water, and dried at 150° C. for 5 hours to prepare a layered double hydroxide (LDH) of the formula $Co_2Al(OH)_6(NO_3^{2-}) \cdot yH_2O$ (where y is 4 to 6).

b) Preparation of Layered Transition Metal Oxide $NiSO_4(H_2O)_6$ as a nickel precursor, $CoSO_4$ as a cobalt precursor, and $MnSO_4\ H_2O$ as a manganese precursor were added to water at a molar ratio of 80:15:5 to prepare a precursor aqueous solution. While stirring the aqueous solution, a sodium hydroxide aqueous solution was slowly added thereto to neutralize the precursor aqueous solution to precipitate $Ni_{0.8}Co_{0.15}Mn_{0.05}(OH)_2$. The precipitate was filtered, washed, and dried at 80° C. to prepare a $Ni_{0.8}Co_{0.15}Mn_{0.05}(OH)_2$ powder.

The $Ni_{0.8}Co_{0.15}Mn_{0.05}(OH)_2$ powder and $Li_2CO_3$ as a lithium precursor were prepared at a molar ratio of 1:0.515.

The prepared precursors were mixed, put into a furnace, and calcined in a stream of flowing dry air at 750° C. for 20 hours to prepare a layered transition metal oxide.

The layered transition metal oxide thus prepared was dried in the atmospheric air at 150° C. for 5 hours.

The layered transition metal oxide thus prepared was $Li_{1.03}[Ni_{0.8}Co_{0.15}Mn_{0.05}]O_2$.

c) Preparation of Composite Cathode Active Material 0.5 part by weight of the layered double hydroxide and 100 parts by weight of the layered transition metal oxide were mixed by using a dry method to prepare a mixture.

Since a surface of the layered double hydroxide was charged with a positive charge and a surface of the layered transition metal oxide was charged with a negative charge, the layered double hydroxide was attached on the surface of the layered transition metal oxide by electrostatic forces.

The mixture was put into a furnace and calcined in a stream of flowing dry air at 720° C. for 5 hours to prepare a composite cathode active material having 0.5 wt % of $LiCo_2AlO_4$ as a layered transition metal oxide coated on a surface of $Li_{1.03}[Ni_{0.8}Co_{0.15}Mn_{0.05}]O_2$.

During the calcining process, a chemical bond was formed between the layered transition metal oxide and the layered double oxide.

Example 2

A composite cathode active material was prepared in the same manner as in Example 1, except that 1 parts by weight of the layered double hydroxide and 100 part by weight of the layered transition metal oxide were mixed.

The composite cathode active material thus prepared had 1.0 weight percent (wt %) of $LiCo_2AlO_4$ as a layered double oxide (LDO) coated on a surface of $Li_{1.03}[Ni_{0.8}Co_{0.15}Mn_{0.05}]O_2$.

Example 3

A composite cathode active material was prepared in the same manner as in Example 1, except that 2 parts by weight of the layered double hydroxide and 100 parts by weight of the layered transition metal oxide were mixed.

The composite cathode active material thus prepared had 2.0 wt % of $LiCo_2AlO_4$ as a layered double oxide (LDO) coated on a surface of $Li_{1.03}[Ni_{0.8}Co_{0.15}Mn_{0.05}]O_2$.

Example 4 a) Preparation of Layered Double Hydroxide

A layered double hydroxide (LDH) was prepared in the same manner as in Example 1.

b) Preparation of Layered Transition Metal Oxide $NiSO_4(H_2O)_6$ as a nickel precursor, $CoSO_4$ as a cobalt precursor, and $MnSO_4\ H_2O$ as a manganese precursor were added to water at a molar ratio of 80:15:5 to prepare a precursor aqueous solution. While stirring the aqueous solution, a sodium hydroxide aqueous solution was slowly added thereto to neutralize the precursor aqueous solution to precipitate $Ni_{0.8}Co_{0.15}Mn_{0.05}(OH)_2$. The precipitate was filtered, washed, and dried at 80° C. to prepare a $Ni_{0.8}Co_{0.15}Mn_{0.05}(OH)_2$ powder The $Ni_{0.8}Co_{0.15}Mn_{0.05}(OH)_2$ powder and $Li_2CO_3$ as a lithium precursor were prepared at a molar ratio of 1:0.515.

The prepared precursors were mixed, put into a furnace, and calcined in a stream of flowing dry air at 750° C. for 20 hours to prepare a layered transition metal oxide.

The layered transition metal oxide thus prepared and water were mixed at a weight ratio of 1:1 and stirred for 20 minutes to remove residual lithium. The layered transition metal oxide from which residual lithium was removed was filtered.

The filtered, layered transition metal oxide was dried in the atmospheric air at 150° C. for 5 hours.

The layered transition metal oxide thus prepared was $Li_{1.03}[Ni_{0.8}Co_{0.15}Mn_{0.05}]O_2$.

c) Preparation of Composite Cathode Active Material 0.5 parts by weight of the layered double hydroxide and 100 part by weight of the layered transition metal oxide were mixed by using a dry method to prepare a mixture.

While not wanting to be bound by theory, it is understood that because a surface of the layered double hydroxide was charged with a positive charge and a surface of the layered transition metal oxide was charged with a negative charge, the layered double hydroxide was attached on the surface of the layered transition metal oxide by electrostatic forces.

The mixture was put into a furnace and calcined in a stream of flowing dry air at 720° C. for 5 hours to prepare a composite cathode active material having 0.5 wt % of $LiCo_2AlO_4$ coated on a surface of $Li_{1.03}[Ni_{0.8}Co_{0.15}Mn_{0.05}]O_2$.

Example 5

A composite cathode active material was prepared in the same manner as in Example 4, except that 1 parts by weight of the layered double hydroxide and 100 part by weight of the layered transition metal oxide were mixed.

The composite cathode active material thus prepared had 1.0 wt % of $LiCo_2AlO_4$ as a layered double oxide (LDO) coated on a surface of $Li_{1.03}[Ni_{0.8}Co_{0.15}Mn_{0.05}]O_2$.

Example 6

A composite cathode active material was prepared in the same manner as in Example 4, except that 2 parts by weight of the layered double hydroxide and 100 parts by weight of the layered transition metal oxide.

The composite cathode active material thus prepared has 2.0 wt % of $LiCo_2AlO_4$ as a layered double oxide (LDO) coated on a surface of $Li_{1.03}[Ni_{0.8}Co_{0.15}Mn_{0.05}]O_2$.

Example 7

A composite cathode active material was prepared in the same manner as in Example 4, except that a composition of the layered transition metal oxide was changed to $Li_{1.03}$ $[Ni_{0.85}Co_{0.10}Mn_{0.05}]O_2$, and 1 parts by weight of the layered double hydroxide and 100 part by weight of the layered transition metal oxide were mixed.

The composite cathode active material thus prepared had 1.0 wt % of $LiCo_2AlO_4$ as a layered double oxide coated on a surface of $Li_{1.03}[Ni_{0.85}Co_{0.10}Mn_{0.05}]O_2$.

Example 8

A composite cathode active material was prepared in the same manner as in Example 4, except that a composition of the layered transition metal oxide was changed to $Li_{1.03}[Ni_{0.91}Co_{0.05}Mn_{0.4}]O_2$, and 1 parts by weight of the layered double hydroxide and 100 part by weight of the layered transition metal oxide were mixed.

The composite cathode active material thus prepared had 1.0 wt % of $LiCo_2AlO_4$ as a layered double oxide coated on a surface of $Li_{1.03}[Ni_{0.91}Co_{0.05}Mn_{0.04}]O_2$.

Example 9

A composite cathode active material was prepared in the same manner as in Example 4, except that a composition of the layered transition metal oxide was changed to $Li_{1.03}[Ni_{0.91}Co_{0.05}Mn_{0.4}]O_2$, and 2 parts by weight of the layered double hydroxide and 100 parts by weight of the layered transition metal oxide were mixed.

The composite cathode active material thus prepared had 2.0 wt % of $LiCo_2AlO_4$ as a layered double oxide coated on a surface of $L_{1.03}[Ni_{0.91}Co_{0.05}Mn_{0.04}]O_2$.

Example 10

A composite cathode active material was prepared in the same manner as in Example 4, except that a composition of the layered transition metal oxide was changed to $Li_{1.03}[Ni_{0.91}Co_{0.05}Mn_{0.4}]O_2$, and 5 parts by weight of the layered double hydroxide and 100 parts by weight of the layered transition metal oxide were mixed.

The composite cathode active material thus prepared had 5.0 wt % of $LiCo_2AlO_4$ as a layered double oxide coated on a surface of $Li_{1.03}[Ni_{0.91}Co_{0.05}Mn_{0.04}]O_2$.

Example 11

A composite cathode active material was prepared in the same manner as in Example 1, except that the calcination temperature was changed from about 720° C. to about 600° C.

Example 12

A composite cathode active material was prepared in the same manner as in Example 1, except that the calcination temperature was changed from about 720° C. to about 850° C.

Example 13 a) Preparation of Layered Double Hydroxide 10 mL of a solution mixture including 2 mmol of $Co(NO_3)_2 \cdot 6H_2O$ and 1 mmol of $Fe(NO_3)_3 \cdot 9H_2O$ at a molar ratio of 2:1 was added to 0.15 M of NaOH solution being vigorously stirred within 5 seconds and stirred in a nitrogen atmosphere for 25 minutes.

A slurry thus obtained was centrifuged, washed with deionized water, and dried at 150° C. for 5 hours to prepare a layered double hydroxide (LDH) of $Co_2Fe(OH)_6(NO_3^{2-}) \cdot y_2O$ (where y is 4 to 6).

b) Preparation of Layered Transition Metal Oxide

A layered transition metal oxide was prepared in the same manner as in Example 1.

c) Preparation of Composite Cathode Active Material

A composite cathode active material having 0.5 wt % of $LiCo_2FeO_4$ coated on a surface of $Li_{1.03}[Ni_{0.8}Co_{0.15}Mn_{0.05}]O_2$.

Comparative Example 1

The layered transition metal oxide, $Li_{1.03}[Ni_{0.91}Co_{0.05}Mn_{0.04}]O_2$, prepared in Example 8 without a LDO coating was used as a cathode active material.

Comparative Example 2

A composite cathode active material was prepared in the same manner as in Example 4, except that a composition of the layered transition metal oxide was changed to $Li_{1.03}[Ni_{0.91}Co_{0.05}Mn_{0.4}]O_2$, 1 parts by weight of the layered double hydroxide and 100 part by weight of the layered transition metal oxide were mixed, and the calcining process was omitted.

The composite cathode active material thus prepared was a simple mixture of $Li_{1.03}[Ni_{0.91}Co_{0.05}Mn_{0.04}]O_2$ and $Co_2Al(OH)_6(NO_3^{2-}) \cdot yH_2O$ (where y is 4 to 6) as an LDH.

Comparative Example 3

A composite cathode active material was prepared in the same manner as in Example 4, except that a composition of the layered transition metal oxide was changed to $Li_{1.03}[Ni_{0.91}Co_{0.05}Mn_{0.4}]O_2$, 1 parts by weight of the layered double hydroxide and 100 part by weight of the layered transition metal oxide were mixed, and a temperature of the calcining process was changed to 400° C.

The composite cathode active material did not have an LDO on a surface of $Li_{1.03}[Ni_{0.91}Co_{0.05}Mn_{0.04}]O_2$.

(Preparation of Lithium Battery (Half Cell))

Example 14

(Preparation of Cathode)

The composite cathode active material prepared in Example 1, a carbon conducting material (Denka Black), and polyvinylidene fluoride (PVdF) were mixed at a weight ratio of 92:4:4 to prepare a mixture, and the mixture was mixed with N-methylpyrrolidone (NMP) in an agate mortar to prepare a slurry. The slurry was bar coated on an aluminum current collector having a thickness of 15 μm dried at room temperature, dried once more in vacuum at 120° C., and then roll-pressed and punched to prepare a cathode plate having a thickness of 55 μm.

(Preparation of Coin Cell)

The cathode plate thus prepared, a lithium metal as a counter electrode, a PTFE separator, and a saluting prepared by dissolving 1.3 M of LiPF6 in ethylene carbonate (EC)+ diethylene carbonate (DEC)+ethylmethyl carbonate (EMC) at a volume ratio of 3:5:2 as an electrolyte were used to prepare a coin cell.

Examples 15 to 26

Coin cells were prepared in the same manner as in Example 14, except that the composite cathode active materials prepared in Examples 2 to 13 were used instead of the composite cathode active material prepared in Example 1.

Comparative Examples 4 to 6

Coin cells were prepared in the same manner as in Example 14, except that the composite cathode active materials prepared in Comparative Examples 1 to 3 were used instead of the composite cathode active material prepared in Example 1.

Evaluation Example 1: SEM Image Analysis

Surfaces of the composite cathode active material powders prepared in Example 8 and Comparative Examples 1 and 2 were analyzed by using a scanning electron microscope, and the results are shown in FIGS. 1A to 1F.

Figure 1B:
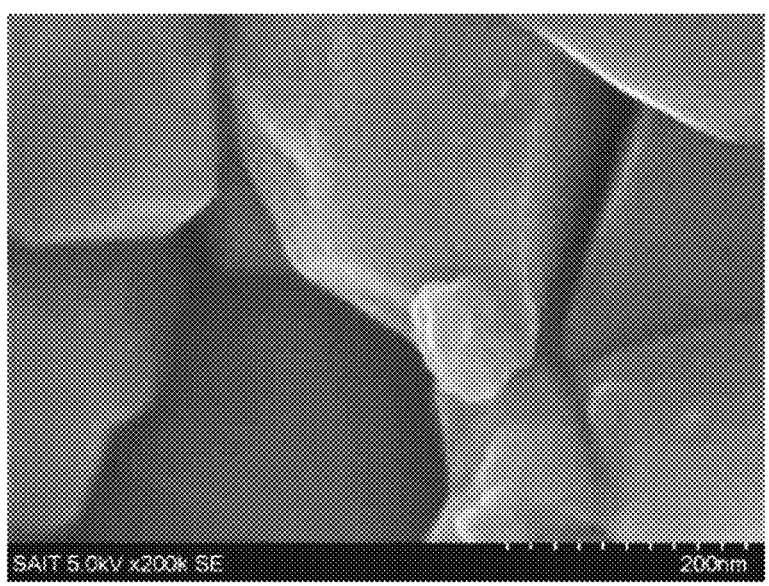
FIG. 1B is an enlarged view of FIG. 1A.
Figure 1C:
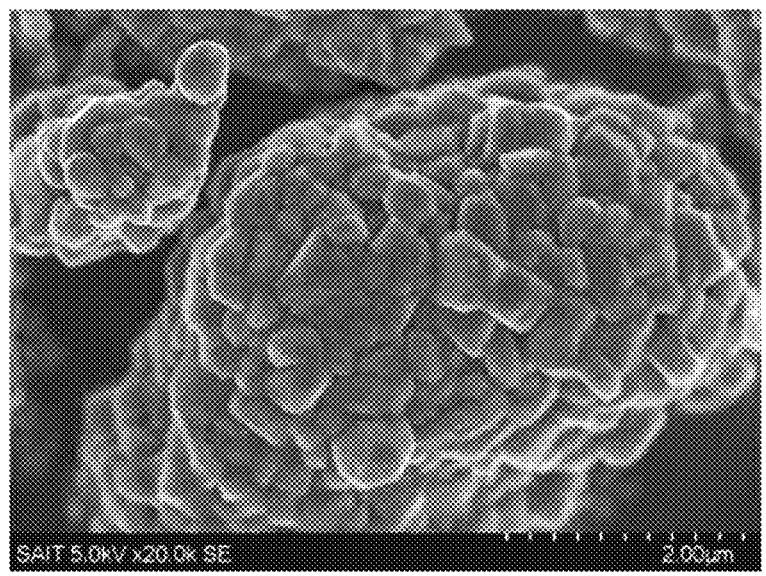
FIG. 1C is an SEM image of a surface of a composite cathode active material prepared in Comparative Example 1.
Figure 1D:
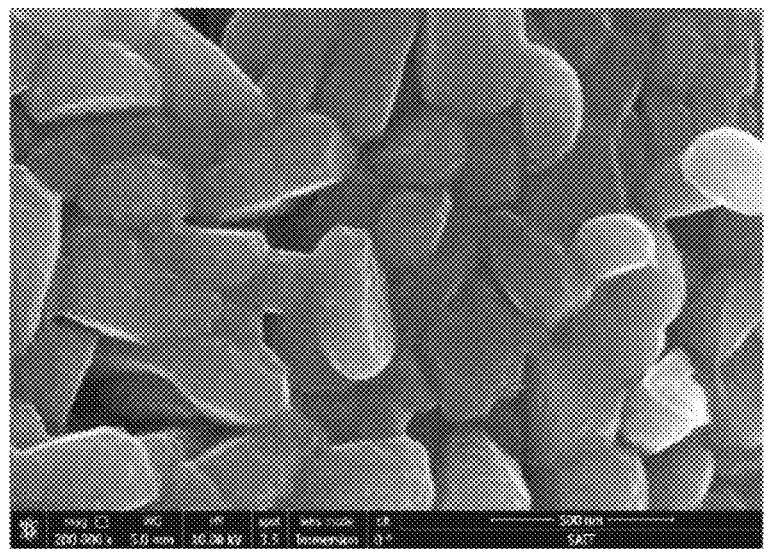
FIG. 1D is an enlarged view of FIG. 1C.
Figure 1E:
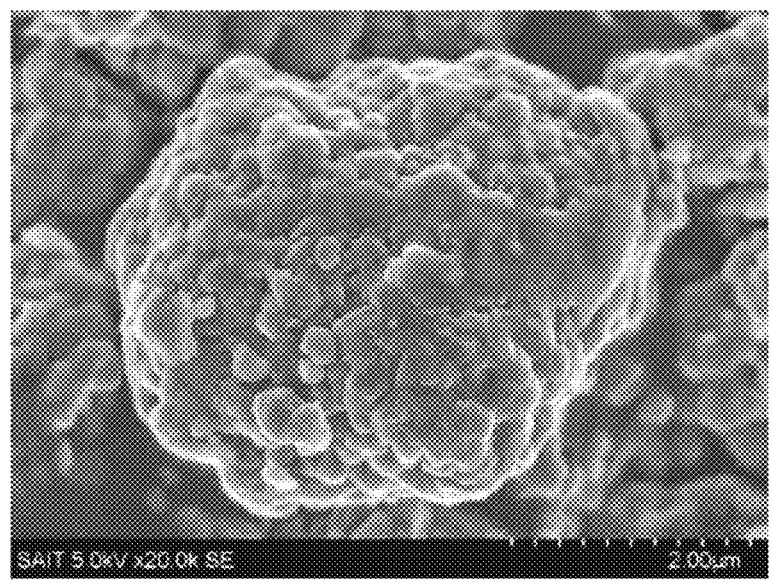
FIG. 1E is an SEM image of a surface of a composite cathode active material prepared in Comparative Example 2.

As shown in FIGS. 1A and 1B, a size of primary particles of the composite cathode active material of Example 8 increased compared to those of the composite cathode active materials prepared in Comparative Examples 1 and 2.

As shown in FIG. 1B, in the composite cathode active material of Example 8, a LDO was evenly coated on a surface of the layered transition metal oxide.

Figure 1F:
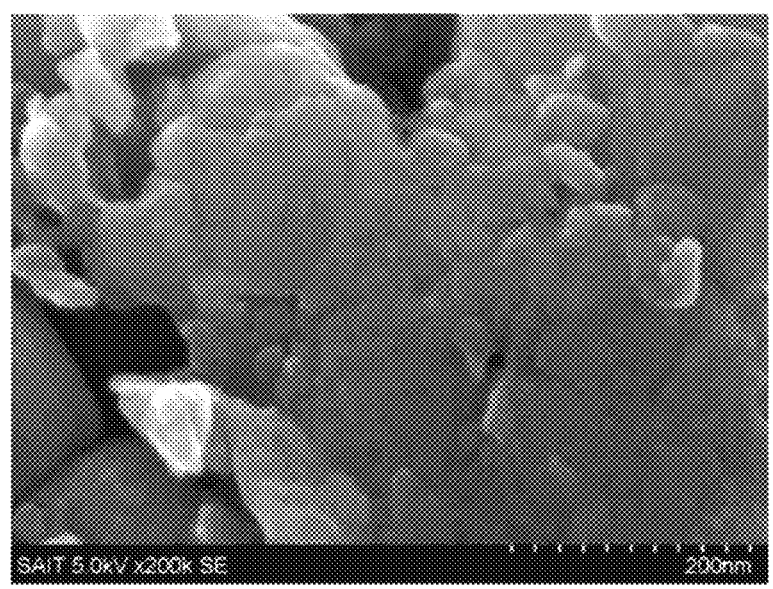
FIG. 1F is an enlarge view of FIG. 1E.

As shown in FIG. 1F, in the composite cathode active material of Comparative Example 2, a LDH was evenly coated on a surface of the layered transition metal oxide.

In the composite cathode active material of Example 8, a thickness of the LDO coating layer was about 100 nm.

Evaluation Example 2: XRD Analysis

Figure 2:
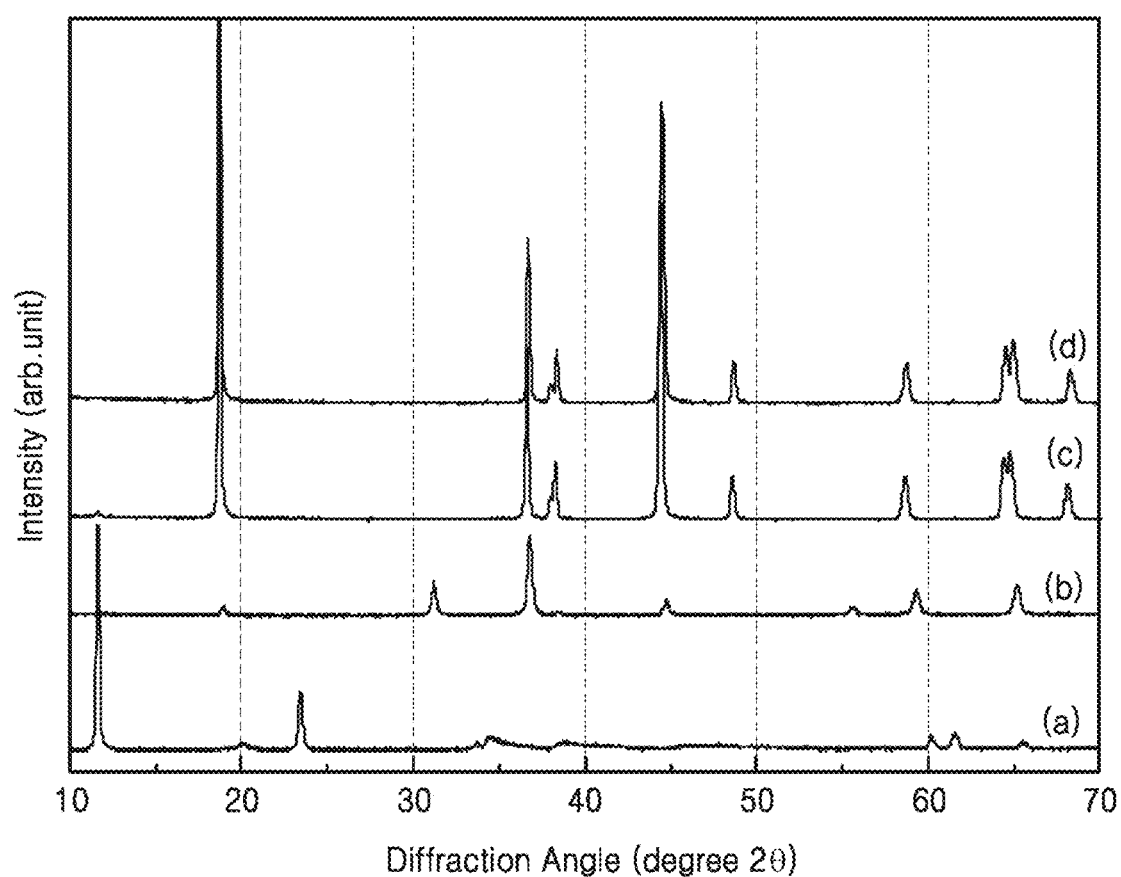
FIG. 2 is a graph of intensity (arbitrary units) versus diffraction angle (degrees two theta ($2\theta$)) and is an X-ray diffraction (XRD) spectrum of (a) a layered double hydroxide, (b) a layered double oxide, (c) a composite cathode active material prepared in Comparative Example 2, and (d) a cathode active material prepared in Example 8.

XRD spectra of the layered double hydroxide (LDH) used in Example 8, the layered double oxide (LDO) that has been obtained by separately calcining the layered double hydroxide, the composite cathode active material prepared in Example 8, and the composite cathode active material prepared in Comparative Example 2 were obtained, and the results are shown in FIG. 2.

As shown in FIG. 2, a characteristics peak of the LDH around 11° was not observed from the composite cathode active material of Example 8, and thus it was confirmed that all the LDH was converted into LDO.

Although the composite cathode active material of Comparative Example 2 includes LDH, the content of LDH was low, and thus an intensity of the characteristic peak around 11° was small.

An interval or a distance between metal oxide layers of the LDO coating layer in Example 8 was about 10 Å.

Although not shown, an interval or a distance between metal oxide layers of the LDO coating layer in Example 13 was about 3.2 Å.

In the composite cathode active material of Example 8, the layered transition metal oxide belongs to a C/2m space group, and the LDO belongs to a R3m space group.

Evaluation Example 3: FT-IR Analysis

Figure 3:
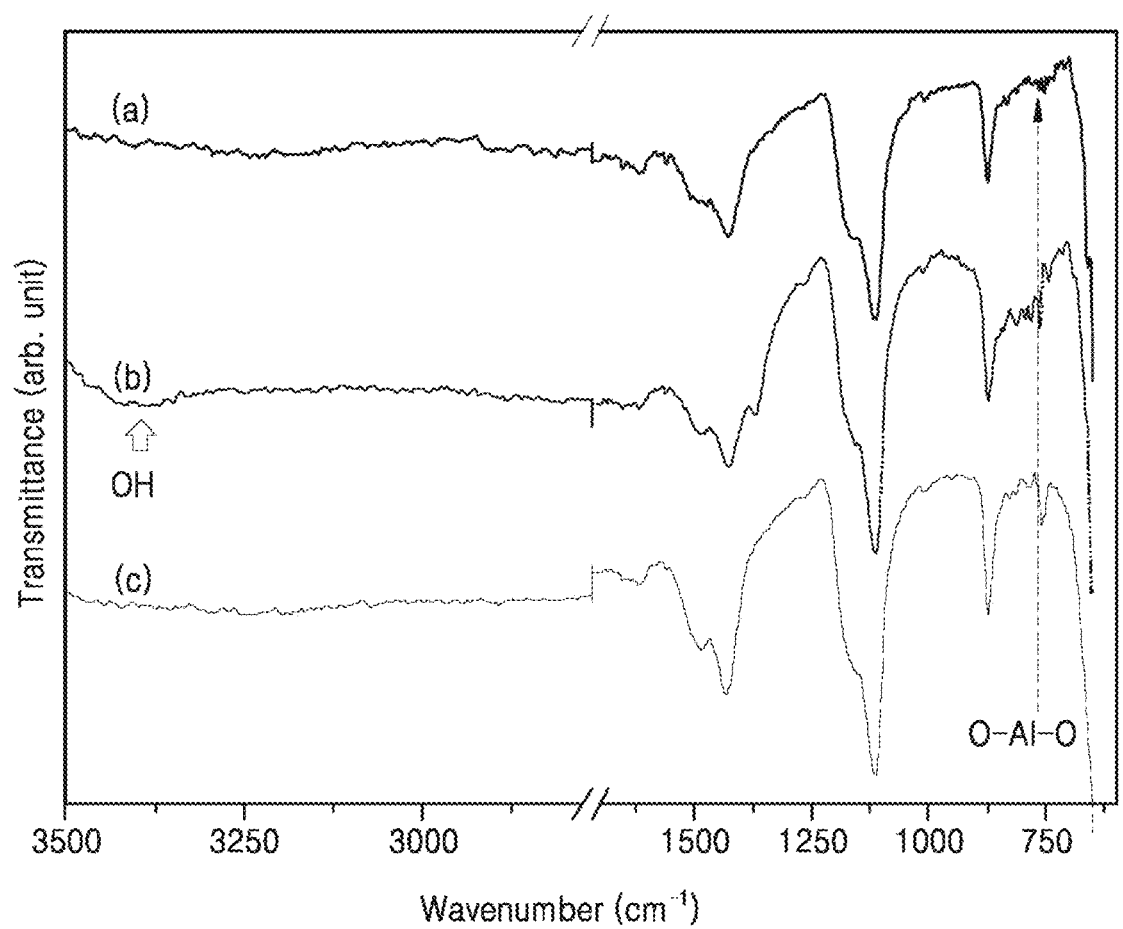
FIG. 3 is a graph of transmittance (arbitrary units) versus wavenumber (inverse centimeters, $cm^{-1}$) and is an FT-IR spectrum of the composite cathode active materials prepared in Comparative Example 1(a), Comparative Example 2(b), and Example 8(c)

An FT-IR spectrum of the composite cathode active material powders prepared in Example 8 and Comparative Examples 1 and 2 were measured, and the results are shown in FIG. 3.

As shown in FIG. 3, a peak at 3380 cm$^{-1}$ corresponding to a OH group derived from the LDH in the composite cathode active material of Example 8 disappeared, and a characteristic peak at 750 cm$^{-1}$ corresponding to an O—Al—O characteristic vibration appeared, and thus it was confirmed that the LDH was oxidized, which allowed the LDO to be evenly coated on a surface of the layered transition metal oxide.

Evaluation Example 4: Raman Spectrum Analysis

Figure 4:
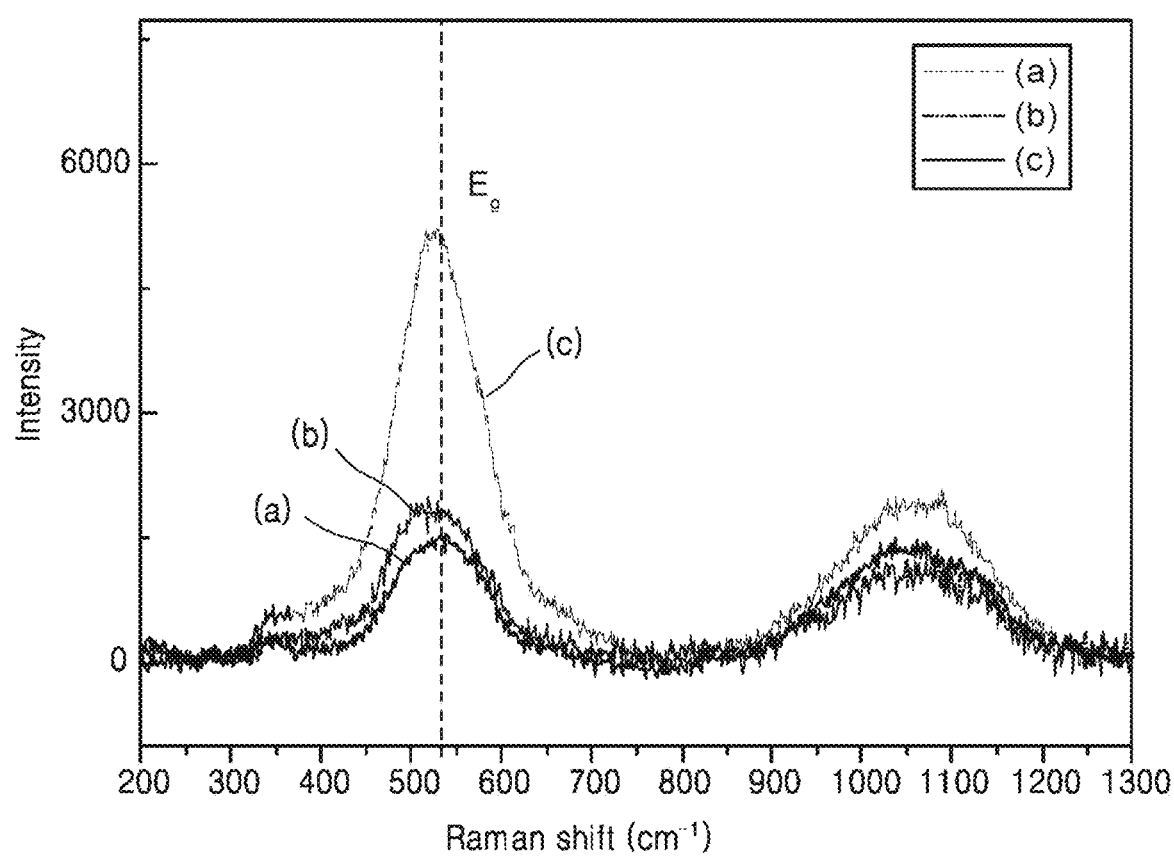
FIG. 4 is a graph of intensity (arbitrary units) versus Raman shift ($cm^{-1}$) and is a Raman spectrum of the composite cathode active materials prepared in Comparative Example 1(a), Comparative Example 2(b), and Example 8(c)

Raman spectra of the composite cathode active material powders prepared in Example 8 and Comparative Examples 1 and 2 were obtained, and the results are shown in FIG. 4.

As shown in FIG. 4, a peak of an Eg band of the composite cathode active material of Example 8 coated with LDO was downshifted compared to an Eg band peak of the composite cathode active material of Comparative Example 1 which was not coated with LDO.

It is deemed that such peak shift occurred due to distortion of a bond between the metal and oxygen atoms (O-M-O) when the layered double oxide coating layer was formed on a surface of the layered transition metal oxide.

The Eg band peak was caused by the bond between the metal existing at an octahedral site and oxygen atoms (O-M-O) in the layered double oxide.

Evaluation Example 5: Zeta Potential Measurement

Figure 5:
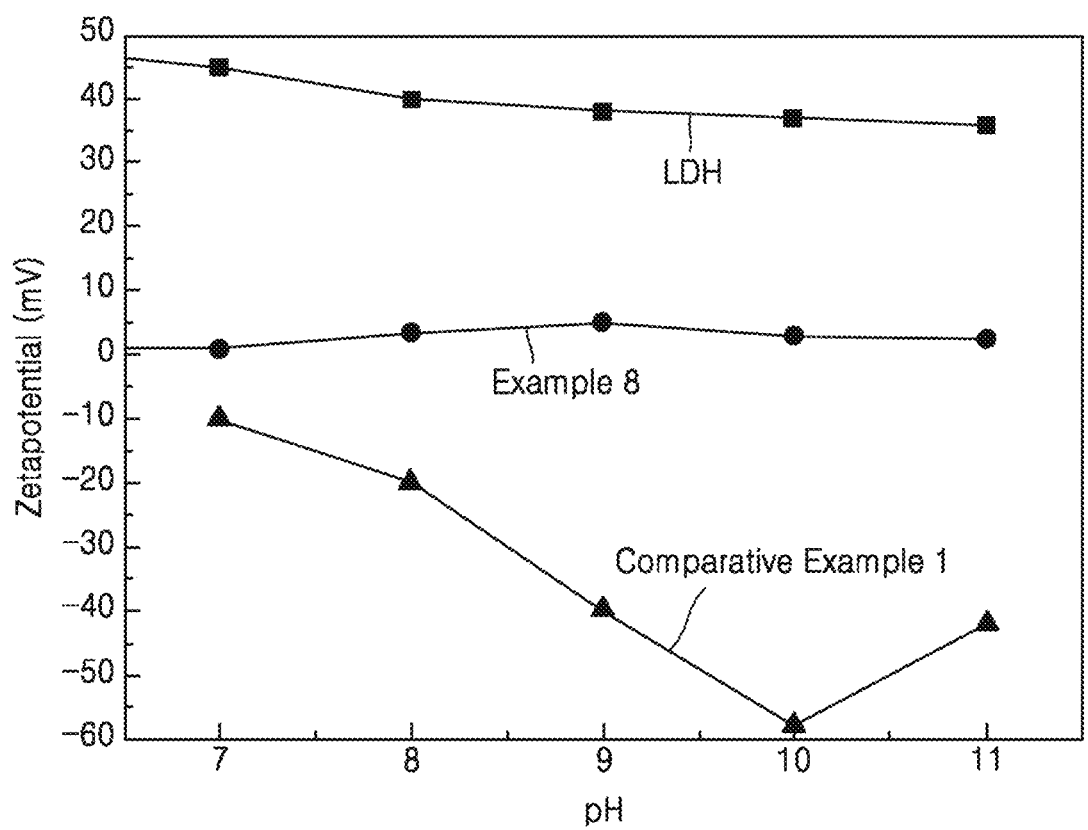
FIG. 5 is as graph of zeta potential (millivolts, mV) versus pH which shows the results of zeta potential measurement performed on the composite cathode active material prepared in Comparative Example 1(▲), a layered double hydroxide (LDH) (■), and Example 8 (●)

Zeta potentials of the LDH prepared in Example 1 and the composite cathode active materials prepared in Example 8 and Comparative Example 1 were measured, and the results are shown in FIG. 5.

The zeta potential was measured by using a zeta potential meter (Nano Z, Malvern).

As shown in FIG. 5, a zeta potential of the composite cathode active material of Example 8 having a LDO coating layer was in a range of about −10 mV to about +10 mV under the condition of pH 7 to 11 which was generally neutral.

On the other hand, the composite cathode active material of Comparative Example 1 was charged to a negative charge, and the LDH was charged to a positive charge.

Evaluation Example 6: Thermal Stability Analysis

Figure 6:
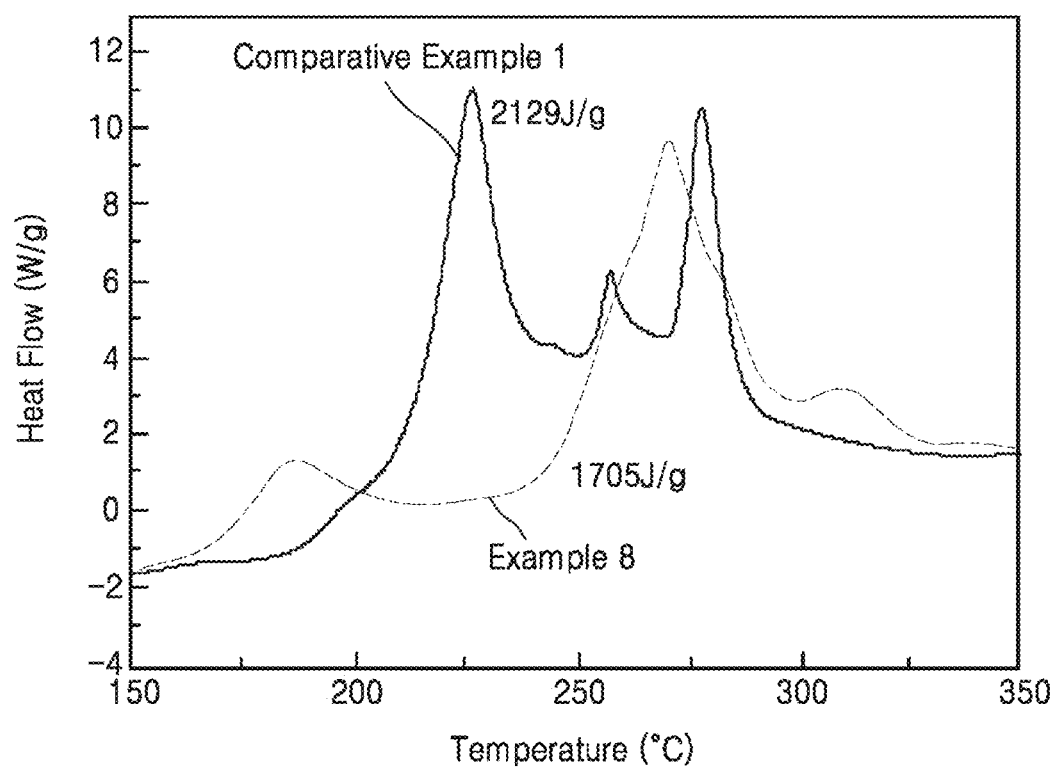
FIG. 6 is a graph of heat flow (Watts per gram, W/g) versus temperature (° C.) which shows the results of differential scanning calorimeter (DSC) analysis of the composite cathode active material prepared in Comparative Example 1 (a solid line) and Example 8 (a broken line)

Caloric values of the composite cathode active materials prepared in Example 8 and Comparative Example 1 were measured by using a differential scanning calorimeter (DSC), and the results are shown in FIG. 6.

As shown in FIG. 6, a caloric value of the composite cathode active material prepared in Example 8 was 1705 J/g, which was about 80% of the caloric value, 2129 J/g, of the composite cathode active material of Comparative Example 1.

Therefore, the thermal stability increased.

Evaluation Example 7: Residual Lithium Content Evaluation

Surface residual lithium contents of the composite cathode active materials prepared in Examples 1 to 8, 11 and 13 and Comparative Example 1 were measured, and the results are shown in Table 1.

The surface residual lithium contents were each evaluated by measuring a Li content in LiCO$_3$ and LiOH remaining on a surface of the composite cathode active material by using a wet method.

TABLE 1

| Example | Surface residual lithium content [ppm] |
| --- | --- |
| Example 1 | 2086 |

TABLE 1-continued

| Example | Surface residual lithium content [ppm] |
|---|---|
| Example 2 | 1865 |
| Example 3 | 1572 |
| Example 4 | 784 |
| Example 5 | 729 |
| Example 6 | 727 |
| Example 7 | 656 |
| Example 8 | 2247 |
| Example 11 | 2319 |
| Example 12 | 890 |
| Example 13 | 1865 |
| Comparative Example 1 | 2760 |

As shown in Table 1, the composite cathode active materials of Examples 1 to 8 had surface residual lithium contents that decreased about 15% or more compared to that of the composite cathode active material of Comparative Example 1.

Evaluation Example 8: Pellet Density Evaluation

Pellet densities of the composite cathode active materials prepared in Examples 1 to 8 and Comparative Example 1 were measured, and the results are shown in Table 2.

The pellet densities were each measured by molding the composite cathode active material into a pellet and using a volume and a weight of the pellet.

TABLE 2

|  | Pellet density [g/cc] |
|---|---|
| Example 1 | 2.99 |
| Example 2 | 2.99 |
| Example 3 | 2.99 |
| Example 4 | 2.99 |
| Example 5 | 2.99 |
| Example 6 | 2.99 |
| Example 7 | 2.99 |
| Example 8 | 2.94 |
| Comparative Example 1 | 2.92 |

As shown in Table 2, the pellet densities of the composite cathode active materials of Examples 1 to 8 increased compared to that of the composite cathode active material of Comparative Example 1.

Therefore, the composite cathode active materials of Examples 1 to 8 showed that energy densities thereof were similar to or higher than that of the composite cathode active material of Comparative Example 1.

Evaluation Example 9: Charging/Discharging Characteristics Evaluation

At 25° C., the lithium batteries prepared in Examples 14 to 26 and Comparative Example 4 were charged with a constant current (CC) of 0.1 C rate until a voltage was 4.34 V (vs. Li), and the current was cut-off at 0.05 C rate while the voltage was maintained at 4.35 V in a constant voltage mode (CV). Then, the batteries were discharged with a constant current (CC) of 0.1 C rate until a voltage of the discharge was 2.8 V (vs. Li) (1$^{st}$ cycle).

At 25° C., the lithium batteries underwent the 1$^{st}$ cycle were charged with a constant current of 0.2 C rate until a voltage was 4.35 (vs. Li), and the current was cut-off at a 0.05 C rate while the voltage was maintained at 4.35 V in a CV mode. Then, the batteries were discharged with a constant current of 0.2 C rate until a voltage of the discharge was 2.8 V (vs. Li) (2$^{nd}$ cycle).

At 25° C., the lithium batteries underwent the 1$^{st}$ cycle and the 2$^{nd}$ cycle as a formation step were charged with a constant current of 0.1 C rate until a voltage was 4.35 (vs. Li), and the current was cut-off at a 0.05 C rate while the voltage was maintained at 4.35 V in a CV mode. Then, the batteries were discharged with a constant current of 0.1 C rate until a voltage of the discharge was 2.8 V (vs. Li). The cycles were repeated 50 times.

In the total charging/discharging cycle, 10 minutes of retention time was set after every charging/discharging cycle.

Figure 7:
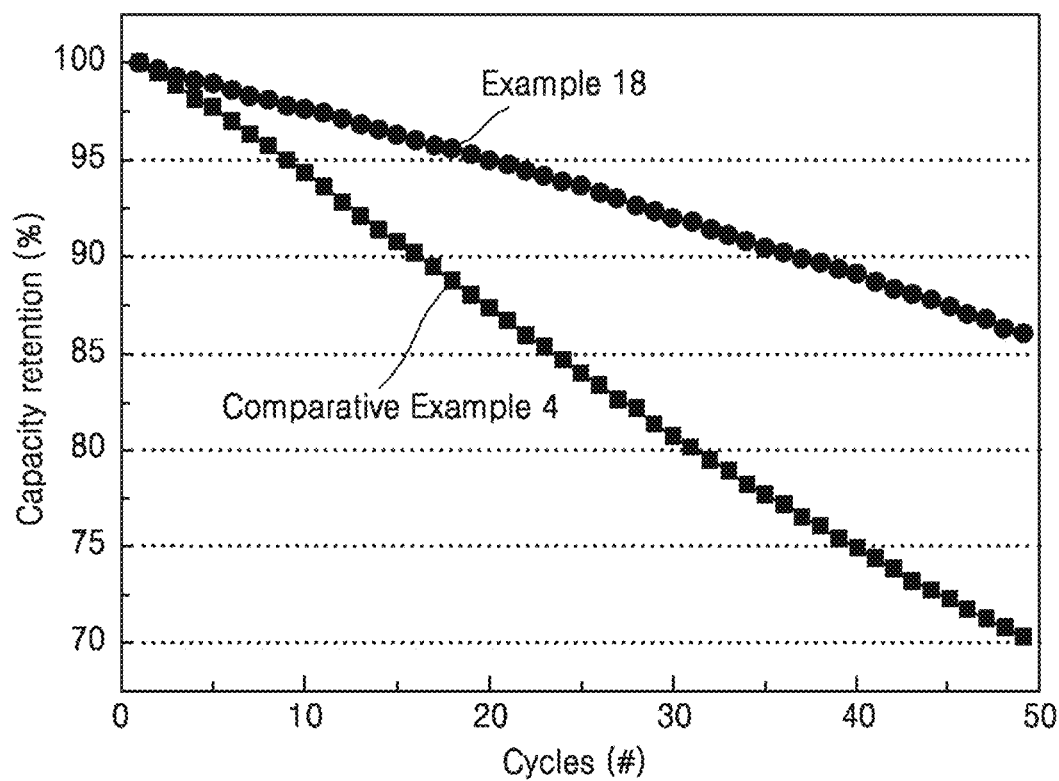
FIG. 7 is a graph of capacity retention (percent, %) versus cycle number that shows cycle characteristics of lithium batteries prepared in Comparative Example 4 (■) and Example 18 (●)

The charging/discharging test results are shown in Table 3 and FIG. 7. A capacity retention rate at the 50$^{th}$ cycle is defined as shown in Equation 1.

A capacity retention rate at 50$^{th}$ cycle [%]=[A discharge capacity at 50$^{th}$ cycle/a discharge capacity at 1$^{st}$ cycle]×100%   Equation 1

TABLE 3

| Example | Capacity retention rate at 50$^{th}$ cycle [%] |
|---|---|
| Example 14 | 92 |
| Example 15 | 93 |
| Example 16 | 92 |
| Example 17 | 90 |
| Example 18 | 88 |
| Example 19 | 90 |
| Example 20 | 91 |
| Example 21 | 86 |
| Example 22 | 85 |
| Example 23 | 80 |
| Example 24 | 84 |
| Example 25 | 88 |
| Example 26 | 92 |
| Comparative Example 4 | 70 |

As shown in Table 3, lifespan characteristics of the lithium batteries of Examples 11 to 20 including the composite cathode active materials after washing improved compared to those of the lithium battery of Comparative Example 4.

As shown in FIG. 7, lifespan characteristics of the lithium battery of Example 18 improved about 20% or more compared to those of the lithium battery of Comparative Example 4.

Also, a discharge capacity of the lithium battery of Example 18 at the 1$^{st}$ cycle was 215 milliampere-hours per gram (mAh/g), which was greater than a discharge capacity, 208 mAh/g, of the lithium battery of Comparative Example 4 at the 1$^{st}$ cycle.

As described above, according to an embodiment, when a composite cathode active material includes a layered double oxide on a surface thereof, charging/discharging characteristics and thermal stability of a lithium battery improve.

It should be understood that embodiments described herein should be considered in a descriptive sense only and not for purposes of limitation. Descriptions of features, advantages, or aspects within each embodiment should be considered as available for other similar features, advantages, or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A composite cathode active material, comprising:
a first metal oxide having a first layered crystal structure; and
a second metal oxide having a second layered crystal structure,
wherein the second metal oxide comprises a layered double oxide.

2. The composite cathode active material of claim 1 comprising:
a core, which comprises the first metal oxide; and
a coating layer, which comprises the second metal oxide and is disposed on a surface of the core.

3. The composite cathode active material of claim 2, wherein the coating layer is disposed on a portion of an outer surface of the core.

4. The composite cathode active material of claim 1, wherein the second metal oxide is attached to the first metal oxide by a chemical bond.

5. The composite cathode active material of claim 1,
wherein a structure of the first metal oxide has a first space group,
wherein a structure of the second metal oxide has a second space group, and
wherein the first space group and the second space group are different.

6. The composite cathode active material of claim 1,
wherein the structure of the first metal oxide belongs to space group C2/m, and
wherein structure of the second metal oxide belongs to space group R3m.

7. The composite cathode active material of claim 1,
wherein the second metal oxide comprises a metal, and
wherein the metal occupies a crystallographic site of the second metal oxide having octahedral coordination.

8. The composite cathode active material of claim 1, wherein the second metal oxide comprises a layered double hydroxide that is represented by Formula 1:

$$M1_aM2_bM3_cO_4 \quad \text{Formula 1}$$

wherein, in Formula 1,
0≤a≤2, 0<c≤2, and b+c=3;
M1 is an alkali metal,
M2 is a metal and comprises an element of Groups 2, 9, 10, 11, or 12, and
M3 is a metal and comprises an element of Groups 3, 4, 5, 8, or 13.

9. The composite cathode active material of claim 1, wherein the second metal oxide comprises a layered double oxide that is represented by Formula 2:

$$Li_aM2_bM3_cO_4 \quad \text{Formula 2}$$

wherein, in Formula 2,
0≤a≤2, 0<c≤2, b>c, and b+c=3;
M2 is a metal and comprises Co, Mg, Ni, Cu, or Zn, and
M3 is a metal and comprises Ce, Al, Fe, V, Ti, or Ga.

10. The composite cathode active material of claim 1, wherein the layered double oxide of the second metal oxide comprises LiCo$_2$CeO$_4$, LiMg$_2$CeO$_4$, LiNi$_2$CeO$_4$, LiCu$_2$CeO$_4$, LiZn$_2$CeO$_4$, LiCo$_2$AlO$_4$, LiMg$_2$AlO$_4$, LiNi$_2$AlO$_4$, LiCu$_2$AlO$_4$, LiZn$_2$AlO$_4$, LiCo$_2$FeO$_4$, LiMg$_2$FeO$_4$, LiNi$_2$FeO$_4$, LiCu$_2$FeO$_4$, LiZn$_2$FeO$_4$, LiCo$_2$VO$_4$, LiMg$_2$VO$_4$, LiNi$_2$VO$_4$, LiCu$_2$VO$_4$, LiZn$_2$VO$_4$, LiCo$_2$TiO$_4$, LiMg$_2$TiO$_4$, LiNi$_2$TiO$_4$, LiCu$_2$TiO$_4$, LiZn$_2$TiO$_4$, LiCo$_2$GaO$_4$, LiMg$_2$GaO$_4$, LiNi$_2$GaO$_4$, LiCu$_2$GaO$_4$, LiZn$_2$GaO$_4$, or a combination thereof.

11. The composite cathode active material of claim 1, wherein an interval between metal oxide layers of the layered double oxide is in a range of about 1 Angstrom to about 10 Angstroms.

12. The composite cathode active material of claim 1, wherein an amount of the second metal oxide is in a range of about 0.05 parts to about 20 parts by weight, based on 100 parts by weight of the first metal oxide.

13. The composite cathode active material of claim 2, wherein a thickness of the coating layer is 200 nanometers or less.

14. The composite cathode active material of claim 1, wherein a caloric value of the composite is 90% or less of a caloric value of the first metal oxide.

15. The composite cathode active material of claim 1, wherein an amount of lithium remaining on the surface of the composite is 90% or less than an amount of lithium remaining on the surface of the first metal oxide.

16. The composite cathode active material of claim 1, wherein a zeta potential of the composite is in a range of about −20 millivolts to about +20 millivolts at a pH in a range of about 9 to about 11.

17. The composite cathode active material of claim 1, wherein the composite has a vibration peak in a range of about 730 cm' to about 770 cm' in an IR-spectrum of the composite.

18. The composite cathode active material of claim 1, wherein a Raman shift of a peak corresponding to an Eg band of the Raman spectrum of the composite is greater than a Raman shift of a peak corresponding to an Eg band of the first metal oxide.

19. The composite cathode active material of claim 1, wherein the first metal oxide comprises a compound that is represented by Formula 3:

$$Li_xM_yO_z \quad \text{Formula 3}$$

wherein, in Formula 3,
0≤x≤3, 1≤y≤3, and 2≤z≤8; and
M comprises an element of Group 2 to Group 13, or a combination thereof.

20. The composite cathode active material of claim 1, wherein the first metal oxide comprises a compound that is represented by one of Formulas 4 to 6:

$$Li_xCo_{1-y}M_yO_{2-\alpha}X_\alpha \quad \text{Formula 4}$$

$$Li_xNi_{1-y}Me_yO_{2-\alpha}X_\alpha \quad \text{Formula 5}$$

$$Li_xNi_{1-y-z}Mn_yMa_zO_{2-\alpha}X_\alpha \quad \text{Formula 6}$$

wherein, in Formulas 4 to 6,
0.90≤x≤1.1, 0≤y≤0.9, 0<z≤0.2, and 0≤α≤2;
M comprises Ni, Mn, Zr, Al, Mg, Ag, Mo, Ti, V, Cr, Fe, Cu, B, or a combination thereof,
Me comprises Co, Zr, Al, Mg, Ag, Mo, Ti, V, Cr, Mn, Fe, Cu, B, or a combination thereof,
Ma comprises Co, Zr, Al, Mg, Ag, Mo, Ti, V, Cr, Fe, Cu, B, or a combination thereof, and
X comprises O, F, S, P, or a combination thereof.

21. The composite cathode active material of claim 1, wherein the first metal oxide comprises a compound that is represented by Formula 7:

$$Li_xNi_{1-y-z}Mn_yCo_zO_2 \quad \text{Formula 7}$$

wherein, in Formula 7,
0.90≤x≤1.1, 0≤y≤0.2, 0<z≤0.2, and 0.7≤1−y−z≤0.99.

22. The composite cathode active material of claim 1, wherein the first metal oxide comprises a compound that is represented by one of Formulas 8 to 10:

$$Li[Li_{1-a}Me_a]O_{2+d} \quad \text{Formula 8}$$

wherein, in Formula 8,
0.8≤a<1 and 0≤d≤0.1; and
Me comprises Ni, Co, Mn, Al, V, Cr, Fe, Zr, Re, B, Ge, Ru, Sn, Ti, Nb, Mo, Pt, or a combination thereof, $$Li[Li_{1-x-y-z}Ma_xMb_yMc_z]O_{2+d} \quad \text{Formula 9}$$

wherein, in Formula 9,
0.8≤x+y+z<1, 0<x<1, 0<y<1, 0<z<1, and 0≤d<0.1; and
Ma, Mb, and Mc each independently comprise Mn, Co, Ni, Al, or a combination thereof, $$Li[Li_{1-x-y-z}Ni_xCo_yMn_z]O_{2+d} \quad \text{Formula 10}$$

wherein, in Formula 10,
0.8≤x+y+z<1; 0<x<1, 0<y<1, 0<z<1, and 0≤d≤0.1.

23. A cathode comprising the composite cathode active material of claim 1.

24. A lithium battery comprising the cathode of claim 23.

25. A method of preparing a composite cathode active material, the method comprising:
contacting a layered double hydroxide and a first metal oxide having a first layered crystal structure to prepare a mixture; and
calcining the mixture to prepare the composite cathode active material, wherein the composite cathode active material comprises
a core, which comprises the first metal oxide, and
a coating layer on the core, wherein the coating layer comprises a layered double oxide.

26. The method of claim 25, wherein the contacting of the layered double hydroxide and the first metal oxide comprises dry mixing.

27. The method of claim 25, wherein the calcining of the mixture is performed at a temperature of 500° C. or greater.

28. The method of claim 25, wherein the calcining of the mixture is performed in an oxidizing atmosphere.

29. The method of claim 25, wherein the method further comprises attaching the layered double hydroxide to a surface of the first metal oxide by an electrostatic force.

30. The method of claim 25, wherein the layered double hydroxide is represented by Formula 11:

$$[M2^{2+}_{1-x}M3^{3+}_x(OH)_2]^{x+}[A^{n-}]_{x/n} \cdot yH_2O \quad \text{Formula 11}$$

wherein, in Formula 11,
0.1≤x≤0.4, 0<y,
$M2^{2+}$ comprises $Co^{2+}$, $Mg^{2+}$, $Ni^{2+}$, $Cu^{2+}$, or $Zn^{2+}$,
$M3^{3+}$ comprises $Ce^{3+}$, $Al^{3+}$, $Fe^{3+}$, $V^{3+}$, $Ti^{3+}$, or $Ga^{3+}$,
$A^{n-}$ comprises $NO_3^{2-}$, $SO_4^{2-}$, $CO_3^{2-}$, $PO_4^{2-}$, $Cl^-$, or a combination thereof, and
n is a valence of the anion.

* * * * *